United States Patent
Hogg

(10) Patent No.: US 12,475,505 B2
(45) Date of Patent: Nov. 18, 2025

(54) SYSTEM AND METHOD FOR INTRODUCTION OF A TRANSACTION MECHANISM TO AN E-COMMERCE WEBSITE WITHOUT NECESSITATION OF MULTIPARTY SYSTEMS INTEGRATION

(71) Applicant: RENT-A-CENTER WEST, INC., Plano, TX (US)

(72) Inventor: Jason Jude Hogg, St. Petersburg, FL (US)

(73) Assignee: RENT-A-CENTER WEST, INC., Plano, TX (US)

( * ) Notice: Subject to any disclaimer, the term of this patent is extended or adjusted under 35 U.S.C. 154(b) by 0 days.

(21) Appl. No.: 17/196,365

(22) Filed: Mar. 9, 2021

(65) Prior Publication Data

US 2021/0279789 A1    Sep. 9, 2021

Related U.S. Application Data

(60) Provisional application No. 63/081,107, filed on Sep. 21, 2020, provisional application No. 62/987,081, filed on Mar. 9, 2020.

(51) Int. Cl.
*G06Q 30/0601*    (2023.01)
*G06Q 20/02*    (2012.01)
(Continued)

(52) U.S. Cl.
CPC ........ *G06Q 30/0641* (2013.01); *G06Q 20/02* (2013.01); *G06Q 20/12* (2013.01);
(Continued)

(58) Field of Classification Search
CPC .... G06Q 30/0641; G06Q 20/02; G06Q 20/12; G06Q 20/29; G06Q 20/351; G06Q 30/0635; G06Q 30/0645
(Continued)

(56) References Cited

U.S. PATENT DOCUMENTS 7,587,353 B2    9/2009    Melchior et al.
8,370,229 B2    2/2013    Moduga et al.
(Continued)

FOREIGN PATENT DOCUMENTS

AU    2019200041 A1 *    1/2019    .......... G06Q 20/085
WO    2020/219590 A1    10/2020

OTHER PUBLICATIONS

Huang, Xiaodi et al, "BulaPay: a novel web service based third-party payment system for e-commerce," Dec. 2, 2014, Electron Commer Res 14, 611-633 (Year: 2014).*
(Continued)

*Primary Examiner* — Marissa Thein
*Assistant Examiner* — Thomas Joseph Sullivan
(74) *Attorney, Agent, or Firm* — Sterne, Kessler, Goldstein & Fox, P.L.L.C.

(57) ABSTRACT

In illustrative embodiments, systems and methods are disclosed by which a transaction offering that is not native to an e-commerce website may be added thereto. The addition may be performed by a script file loaded by the web browser that is rendering the e-commerce website. The script may add a user interface element to the e-commerce website that a user may click in order to initiate the added transaction offering. The script file may respond to the such a click event by presenting a user interface with which the user may interact in order to effectuate the transaction. The script may scrape information from the website to obtain information necessary for creation of the transaction, and may initiate purchase of goods or services from the website after creation of transaction.

13 Claims, 35 Drawing Sheets

(51) Int. Cl.
*G06Q 20/12* (2012.01)
*G06Q 20/22* (2012.01)
*G06Q 20/34* (2012.01)
G06Q 30/0645 (2023.01)

(52) U.S. Cl.
CPC ........... *G06Q 20/29* (2013.01); *G06Q 20/351* (2013.01); *G06Q 30/0635* (2013.01); *G06Q 30/0645* (2013.01)

(58) Field of Classification Search
USPC ....................................................... 705/27.1
See application file for complete search history.

(56) References Cited

U.S. PATENT DOCUMENTS

| | | | |
|---|---|---|---|
| 8,370,264 | B1 | 2/2013 | Wei et al. |
| 8,504,442 | B2 | 8/2013 | Golden et al. |
| 8,505,813 | B2 | 8/2013 | Grossman et al. |
| 8,595,076 | B2 | 11/2013 | Jean et al. |
| 8,626,669 | B2 | 1/2014 | Sparks et al. |
| 8,706,624 | B2 | 4/2014 | Don et al. |
| 8,732,047 | B2 | 5/2014 | Sandholm et al. |
| 8,788,353 | B2 | 7/2014 | Hills |
| 9,037,495 | B2 | 5/2015 | Nagarajan et al. |
| 9,129,322 | B2 | 9/2015 | Rausch et al. |
| 9,196,126 | B2 | 11/2015 | Marantelli |
| 9,430,777 | B1 | 8/2016 | Strand |
| 9,805,424 | B2 | 10/2017 | Kapoor |
| 9,928,507 | B2 | 3/2018 | Dayalan |
| 9,946,790 | B1 | 4/2018 | Siegel et al. |
| 10,003,698 | B2 | 6/2018 | Torgersrud |
| 10,089,682 | B1 | 10/2018 | Bernstein et al. |
| 10,282,778 | B1* | 5/2019 | Bernstein ........... G06Q 30/0645 |
| 10,296,897 | B1 | 5/2019 | Wu et al. |
| 10,402,817 | B1 | 9/2019 | Benkreira et al. |
| 10,430,868 | B2 | 10/2019 | Nijim et al. |
| 10,733,686 | B2 | 8/2020 | Li et al. |
| 10,796,362 | B2 | 10/2020 | Seergy et al. |
| 10,872,349 | B1 | 12/2020 | Hijirida et al. |
| 10,891,687 | B2 | 1/2021 | Bernstein et al. |
| 10,937,046 | B1* | 3/2021 | Henderson ......... G06Q 30/0641 |
| 11,288,642 | B1* | 3/2022 | Hawes ................. G06Q 20/102 |
| 11,430,000 | B1* | 8/2022 | Depaolo ........... G06Q 30/0601 |
| 11,657,429 | B1 | 5/2023 | Meeboer |
| 11,869,027 | B1 | 1/2024 | Corrieri et al. |
| 11,966,969 | B2 | 4/2024 | Bernstein et al. |
| 11,983,767 | B2 | 5/2024 | Frohwein et al. |
| 12,033,159 | B2 | 7/2024 | Cueli et al. |
| 12,067,611 | B2 | 8/2024 | Bernstein et al. |
| 2001/0056409 | A1 | 12/2001 | Bellovin et al. |
| 2007/0087822 | A1 | 4/2007 | Van Luchene |
| 2007/0114274 | A1 | 5/2007 | Gibbs et al. |
| 2012/0023011 | A1 | 1/2012 | Hurwitz et al. |
| 2012/0095872 | A1 | 4/2012 | Hurwitz et al. |
| 2013/0046687 | A1 | 2/2013 | Simpson, Jr. |
| 2013/0254001 | A1 | 9/2013 | Acar et al. |
| 2013/0290149 | A1 | 10/2013 | Rashwan |
| 2014/0337161 | A1 | 11/2014 | Whisnant et al. |
| 2016/0063463 | A1* | 3/2016 | Min ....................... G06Q 20/12 705/44 |
| 2016/0071102 | A1 | 3/2016 | Alvarez et al. |
| 2016/0140519 | A1* | 5/2016 | Trepca ..................... G06N 7/01 705/26.44 |
| 2016/0239861 | A1 | 8/2016 | Hage |
| 2016/0314522 | A1 | 10/2016 | Kabello et al. |
| 2017/0011441 | A1 | 1/2017 | Buezas et al. |
| 2017/0132624 | A1 | 5/2017 | Muchang et al. |
| 2017/0278174 | A1* | 9/2017 | Harrell ................ G06Q 20/401 |
| 2018/0349283 | A1* | 12/2018 | Bhatia ................ H04N 21/4782 |
| 2019/0122209 | A1 | 4/2019 | Shah et al. |
| 2019/0281030 | A1 | 9/2019 | Isaacson et al. |
| 2019/0325445 | A1* | 10/2019 | Anderson ............ G07G 1/0036 |
| 2020/0004880 | A1* | 1/2020 | Sharshevsky ...... G06Q 30/0633 |
| 2020/0014671 | A1 | 1/2020 | Isaacson et al. |
| 2020/0106757 | A1 | 4/2020 | de Ganon et al. |
| 2021/0125262 | A1* | 4/2021 | Corrieri ............ G06Q 30/0601 |
| 2021/0279709 | A1 | 9/2021 | Hogg |
| 2021/0326818 | A1 | 10/2021 | Hogg |
| 2022/0122152 | A1* | 4/2022 | Harrell ................ G06Q 20/401 |
| 2022/0292503 | A1 | 9/2022 | Brock |
| 2024/0420232 | A1 | 12/2024 | Zeringue |
| 2025/0045784 | A1 | 2/2025 | Cotton et al. |

OTHER PUBLICATIONS

International Search Report and Written Opinion for Application No. PCT/US2021/021553 mailed Jun. 29, 2021.
International Search Report and Written Opinion for Application No. PCT/US2021/021555 mailed Jun. 28, 2021.
International Search Report and Written Opinion for Application No. PCT/US2022/035280 mailed Oct. 21, 2022.
"Flexshopper, Inc. Announces the Launch of Flexshopper Wallet, a Mobile Application Enabling Consumers to Lease to Own Merchandise From Any Major Retailer With Their Smartphone," News Bites US—OTC [Melbourne] Oct. 29, 2015; Dialog #1727735807 2pgs. (Year: 2015).
Rent-A-Center Completes Acquisition of Merchants Preferred Business Wire [New York] Aug. 14, 2019, Dialog #2272707190 2pgs. ( Year: 2019).
Co-pending Application, U.S. Appl. No. 19/081,893, filed Mar. 17, 2025.

* cited by examiner

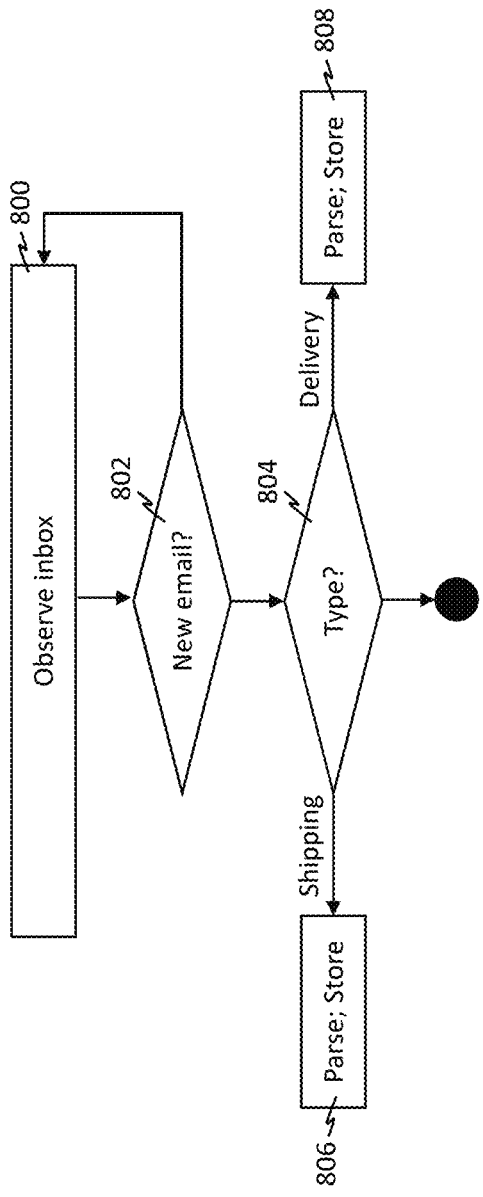
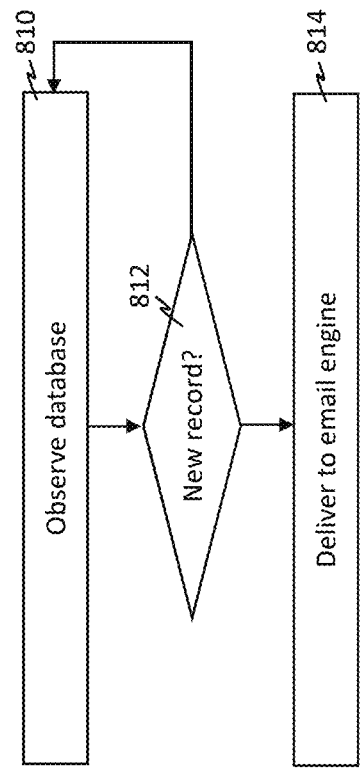
FIG. 8A
FIG. 8B

SYSTEM AND METHOD FOR INTRODUCTION OF A TRANSACTION MECHANISM TO AN E-COMMERCE WEBSITE WITHOUT NECESSITATION OF MULTIPARTY SYSTEMS INTEGRATION

CROSS-REFERENCE TO RELATED APPLICATIONS

This application claims the benefit of U.S. Provisional Patent Application Nos. 62/987,081 and 63/081,107, filed on Mar. 9, 2020, and Sep. 21, 2020, respectively, the contents of which are incorporated by reference.

TECHNICAL FIELD

Herein is disclosed a system and method for introduction of a transaction mechanism to an e-commerce website, and more particularly a system and method for introduction of a transaction mechanism to an e-commerce website without requiring effort on the part of the operator of the aforementioned e-commerce website to participate in systems integration with the operator of the transaction mechanism.

BACKGROUND

Increasingly, commerce is conducted online, with some estimates putting aggregate electronic commerce (e-commerce) volume at approximately $861 billion in the year 2020. Such electronic commerce is constituted predominantly of consumer transactions conducted at e-commerce sites, which may in some instances be the online counterpart to a retailer's brick-and-mortar presence. In order for such commerce to take place, it is essential that there exists a means by which a consumer may initiate payment to the retailer in the absence of a traditional point-of-sale system.

Most e-commerce websites are structured to present items offered for sale by the retailer, and to permit a consumer to add a given product to a digital "shopping cart" for subsequent purchase via an online checkout process. The checkout process is typically initiated from within the aforementioned shopping cart in response to a consumer selecting a "checkout" button, whereupon the consumer is led through a series of webpages wherein the consumer may enter, among other information, payment information. Such payment information typically includes a credit card number, security code, billing ZIP code, name of the person embossed on the credit card, and so on. The software constituting the shopping cart is structured to interact with systems operated by a third party, such as a payment processor, in order to initiate a consumer's desired payment via one of the major payment networks. Thus, today it is the case that most e-commerce websites offer consumers the opportunity to purchase products via a payment transacted with one of the major payment networks.

SUMMARY

Against this background, the present subject matter was developed. According to some embodiments a transaction system permits a user thereof to acquire at least one good marketed for sale on a website via a transaction offering that is not natively offered on the website. The website is operated by an operator of said website, such as an e-retailer. The transaction system includes a computing device that, in turn, includes a processing unit and a memory that is communicably connected with and readable by the processing unit. The memory contains instructions that, when executed by the processing unit cause the processing unit to execute a web browser application. The web browser application is configured to load a browser extension while the web browser application is navigated to the aforementioned website. The browser extension is executed in response to the browser extension having been loaded by the web browser application. The browser extension contains instructions that, when executed, cause said extension to add a user interface element that is not native to the aforementioned website to a page of that website. The browser extension presents a user interface that is not native to the website in response to the user interacting with the aforementioned user interface element. The user interface enables creation of the transaction between the user and a third party that is distinct from said operator of said website. The transaction pertains to a subject matter that includes the aforementioned good or goods. Finally, the extension initiates a purchase of the good or goods, in response to creation of the transaction by the user via the user interface presented by the browser extension.

According to other embodiments, a method is presented for permitting a user of a transaction system to acquire at least one good marketed for sale on a website via a transaction offering that is not natively offered on the website for acquisition of goods. The website is operated by an operator of the website. The method includes executing a web browser application, with the transaction system. The web browser application is configured to load a browser extension while the web browser application is navigated to the aforementioned website. The method further includes executing the browser extension, with the transaction system, in response to the browser extension having been loaded by the web browser application. The browser extension adds a user interface element that is not native to the website to a page of the website. The browser extension presents a user interface that is not native to the website, in response to the user interacting with the aforementioned user interface element. The user interface enables creation of the transaction between the user and a third party that is distinct from the aforementioned operator of said website. The transaction pertains to a subject matter including the aforementioned good or goods. Finally, the browser extension initiates a purchase of the aforementioned good or goods, in response to the creation of the transaction by the user via the user interface presented by the browser extension.

According to other embodiments, a transaction system is disclosed. The transaction system permits its user to acquire at least one good marketed for sale on a website via a transaction offering that is not natively offered on the website for acquisition of the aforementioned good or goods. The website is operated by an operator of said website. The transaction system includes a computing device, which, in turn, includes a processing unit and a memory that is communicably connected with and readable by the processing unit. The memory contains instructions that, when executed by the processing unit cause the processing unit to execute a web browser application. The web browser application is configured to launch a browser extension while the web browser application is navigated to the aforementioned website. The browser extension contains instructions that, when executed, cause said extension to add a user interface element to the website or web browser application. The browser extension presents a user interface that is not native to the website, in response to the user interacting with the aforementioned user interface element. The user interface enables creation of the transaction between the user and a third party that is distinct from the aforementioned operator of the website. The transaction pertains to a subject matter that includes the aforementioned good or goods.

BRIEF DESCRIPTION OF THE DRAWINGS

FIGS. 8A and 8B depict an exemplary method for relaying email correspondence from an e-retailer to a user of the system of FIG. 3, according to certain embodiments.

DETAILED DESCRIPTION

A typical e-commerce checkout process provides a series of webpages where the consumer may enter, among other information, payment information. Such payment information may include a credit card number, security code, billing ZIP code, name of the person embossed on the credit card, and so on. The software constituting the shopping cart is structured to interact with systems operated by a third party, such as a payment processor, in order to initiate a consumer's desired payment via one of the major payment networks.

Some consumers may desire to acquire a product from an e-commerce site through an alternative arrangement or payment mechanism—not by a payment transacted through a major payment network. For example, some consumers may desire to acquire a product from an e-commerce website via a lease-to-own arrangement or other alternative transaction mechanism. Typically, to introduce an alternative transaction mechanism to an e-commerce site, the operator of the e-commerce site would have to engage with the provider of the alternative transaction mechanism. Such engagement would usually include agreeing upon an interface by which the systems operating the e-commerce site could communicate with the systems operating the alternative transaction mechanism, and further include agreeing upon a communication procedure to be conducted through such interface. In the wake of agreeing upon such matters, each party would develop software that behaved in accord with the aforementioned interface and communication procedure, and the parties would cooperate to test such software prior to making it available to the public for use via the e-commerce site. These activities constitute a multiparty systems integration effort.

The multiparty systems integration efforts required in connection with the provisioning of alternative transaction mechanisms to e-commerce websites are expensive, complicated, time-consuming and inefficient. Consequently, they are conducted infrequently and the public suffers in the form of reduced transaction offerings presented by e-commerce websites. There thus exists a need to address this problem.

Figure 1:
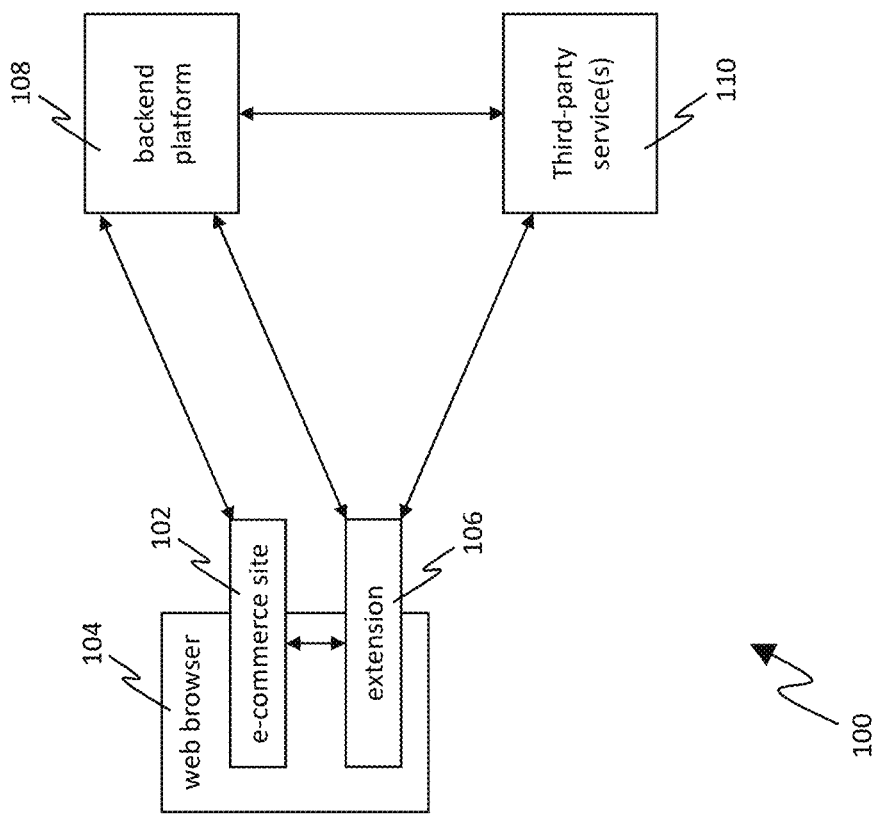
FIG. 1 depicts an exemplary system for introduction of a non-native transaction offering to an e-commerce website, in accordance with certain embodiments.

FIG. 1 depicts an embodiment of a system 100 that introduces a third-party transaction offering into an e-commerce website 102 without necessitation of a multiparty integration. As can be seen from FIG. 1, the e-commerce website 102 is displayed to a user (not depicted) via a web browser 104. The web browser 104 may be executing on a personal computer, laptop computer, tablet, smartphone (such as a device running the iOS® or Android® operating systems) or other mobile device or computing platform. For the sake of simplified discussion, the document may refer to the web browser as executing on a personal computer.

The e-commerce website 102 may be any website 102 that offers a product or service for sale via such website 102. For example, the websites associated with uniform resource locators (URLs) such as https://www.amazon.com, https://www.bestbuy.com, https://www.wayfair.com, https://www.homedepot.com, or https://www.walmart.com are examples of e-commerce websites 102, to name but a few. An e-commerce website 102 is typically structured to permit a user of the web browser 104 to select goods or services for purchase by adding such goods to a digital shopping cart accessible via the website 102, and to permit the user to pay for such goods or services within the cart via a checkout process. The checkout process typically permits the user to enter payment information pertaining to payment cards operable on the major payment networks to pay for the goods or services within the cart. The payment information is typically communicated to a payment processor to structure such information appropriately for the execution of a payment transaction and to direct such payment transaction to the appropriate payment network in accordance with its particular rules, in order to effectuate payment to the e-retailer. The user may have the purchased goods or services delivered to their residence or another location of their choosing, or may pick them up (for example, at a chosen brick-and-mortar retail location).

It may be the case that the user desires to obtain, but not necessarily purchase, goods or services from an e-commerce website 102 pursuant to a transaction structure not offered by the website 102. For example, the user may desire to acquire the goods pursuant to a lease-to-own arrangement, a subscription arrangement, an installment loan arrangement, or any other form of lease, payment or financing arrangement not serviced by major payment networks or not otherwise natively offered via the e-commerce website 102. For the sake of simplified discussion, the particular species of third-party transaction introduced into the e-commerce website 102 is described herein as a lease-to-own arrangement. However, those of skill in the art will understand that the principles disclosed herein are applicable to other varieties of transactional arrangements. Additionally, the goods or services acquired from the e-commerce website 102 are described as goods. Those of skill in the art will understand that certain varieties of transactional arrangements contemplate services as well as goods as the proper subjects of such transactions.

The system 100 includes a browser extension 106 that interoperates with the web browser 104 and certain e-commerce sites 102 that the browser 104 may render. According to some embodiments, the web browser 104 has been configured to launch the extension 106 in response to a user having entered a URL into the browser's 104 URL bar, if the particular URL includes a particular domain. For example, if the URL entered into the URL bar includes the domain "wayfair.com" or "bestbuy.com" and so on, the web browser 104 will respond by launching the extension, typically after having loaded the ecommerce site. The extension 106 may include a configuration file, such as a manifest file, that may describe the conditions under which the web browser 104 is to launch the extension. (Conceptual example: "launch the extension by the name of such-and-such if the URL entered in the URL bar contains the domain "bestbuy.com" or "wayfair.com" or so on.) The configuration file may describe other conditions for launch of the extension, in addition to a particular URL or domain having been entered into the browser's 104 URL bar. The extension 106, itself, may be structured as a JavaScript file, and may interact with the e-commerce site 102 presented via the web browser 104, such as through the JavaScript document object model. According to some embodiments, the user of the web browser 104 will have granted appropriate permissions to the extension 106 to permit its proper operation on the web browser 104.

The system 100 further includes a backend computing platform 108 operated by or on behalf of the third-party entity offering an alternative transactional arrangement such as a lease-to-own arrangement. Continuing with the example wherein the particular species of third-party transaction to be introduced into the e-commerce website 102 is a lease-to-own arrangement, the backend computing platform 108 executes various processes and exposes various application interfaces (APIs), such as web APIs, that cooperate to originate, effectuate and service lease-to-own arrangements. More broadly considered, the backend computing platform 108 executes various processes and exposes various APIs, such as web APIs, that cooperate to originate, effectuate and service alternative transaction structures suitable for conveying goods or services to a third party such as a consumer from an e-commerce website. Carrying on with the exemplary embodiment wherein the alternative transaction is a lease-to-own arrangement, the platform 108 may contain APIs by which the extension 106 interacts with the backend platform 108 to perform such tasks as: identify a pre-existing customer of the lease-to-own company (including retrieving the customer's personally identifiable information, his or her open-to-lease line, his or her remaining open-to-lease line, and so on); validate a particular good as being the appropriate subject of a lease-to-own arrangement, as discussed in more detail below; determine the terms pursuant which the lease-to-own company is willing to lease a particular good (example: monthly payment amount, and number of such monthly payments); construct a contract creating a lease-to-own relationship between a customer and the lease-to-own company, the subject of which is a particular validated good or goods, and the terms of which have been determined by the aforementioned service; and so on. Finally, according to some embodiments, the system 100 includes third-party services 110 that may interoperate with the extension 106 and backend platform 108 in the course of effectuating a lease-to-own arrangement (example: such third party services may include payment processing services extended by a payment processor; document cloud hosting services extended by a document cloud company; and so on).

Figure 2:
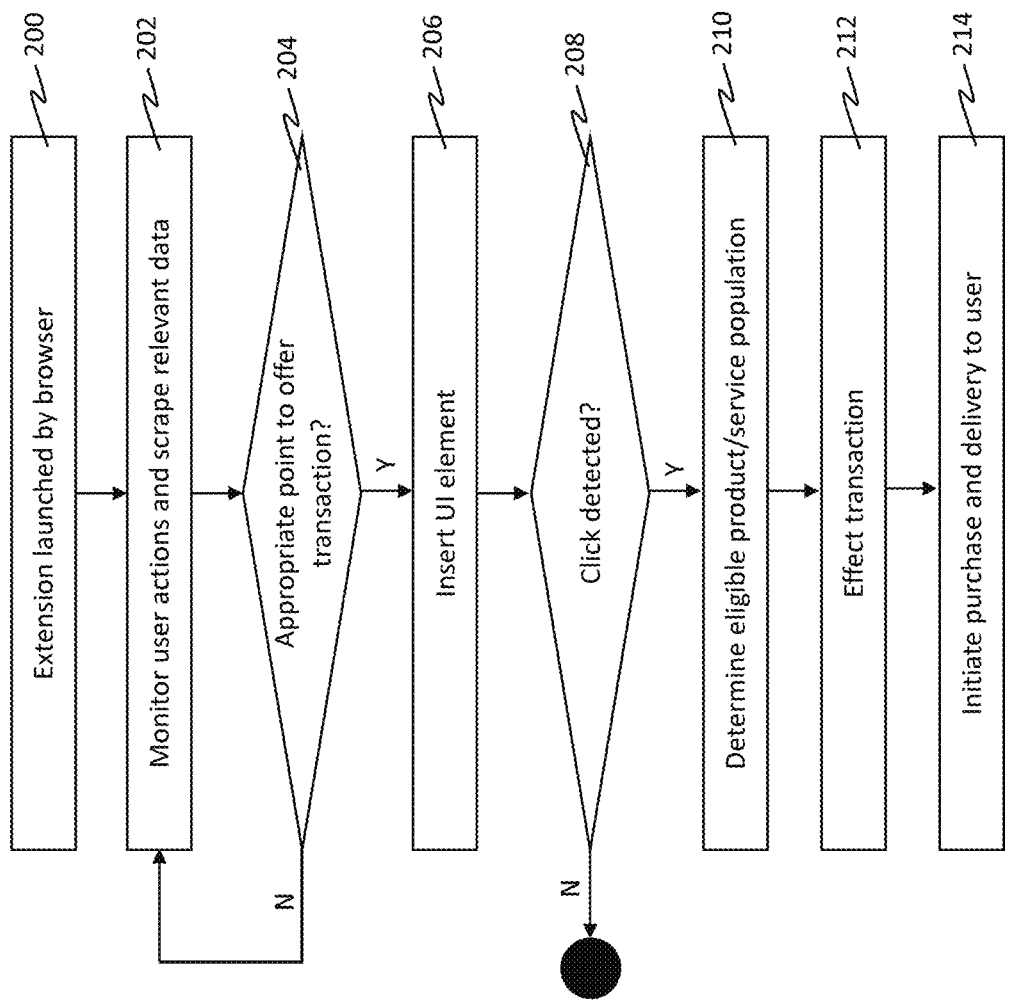
FIG. 2 depicts an exemplary method carried out in connection with the system of FIG. 1, in accordance with certain embodiments.

In use, the system 100 may operate as depicted in FIG. 2. The user of the system 100 may begin his or her shopping experience by navigating to an e-commerce website 102 via a web browser 104 running on his or her computer (not depicted). The web browser 104 detects that the user has navigated to an e-commerce website 102, and responds by launching the extension (operation 200).

As show in operation 202, the extension 106 monitors the actions of the user while he or she shops on the e-commerce website 102. As a part of such activity, the extension 106 interacts with the e-commerce website 102 so as to determine which particular products the user intends to obtain. For example, the extension 106 may scrape such information from the website 102. Note that scraping operations do not require the operator of the e-commerce website 102 to deliberately expose an interface by which such information is conveyed.

The extension monitors the path of navigation of the user through the website 102 in order to determine whether the user has arrived at an appropriate point at which to insert a user interface element, such as a button, offering a lease-to-own arrangement to the user (operations 204 and 206). For example, most digital shopping carts employed by e-commerce websites 102 contain an entry point page, wherein the user can review which particular products are in his or her cart, can remove any unwanted items, and can opt to proceed to check out and therefore pay for the items within the cart. The aforementioned entry point page of the shopping cart may be altered by the extension 106 to include a button offering a lease-to-own arrangement to the user as an alternative option to checking out via the website's 102 native capabilities (meaning that the user will have to pay for the items via one of the major payment networks). Note that by virtue of the aforementioned user interface element (e.g., a button) having been introduced by the extension, the operator of the e-commerce website 102 is relieved of having to take any step whatsoever to cause such introduction of the element or otherwise accommodate it. According to some embodiments, the extension 106 adds the aforementioned user interface element (example: a button) to the web browser 104, itself, such as to a tool bar of the web browser 104.

The extension 106 detects a "click event" pertaining to the user interface element it added during operation 206 (operation 208). If the user clicks the aforementioned user interface element to explore a lease-to-own arrangement, operational flow is passed to operation 210. (If the user elects to check out using the website's 104 native checkout function, then the extension 106 does not interfere.) In operation 210, the extension 106 determines whether the product or products contained within the cart are eligible to be the subject of a lease-to-own relationship. Typically, consumable goods, permanently installed goods, or goods having a sales price less than a particular threshold value are not considered appropriate subjects of a lease-to-own arrangement. To identify the particular goods eligible to be the subject of a lease-to-own relationship, the extension 106 may send a message to the backend computing platform 108 identifying the items within the cart. The backend platform 108 may respond by indicating for each such item whether or not such item is eligible (operation 210). Note that no cooperation with the systems operating the e-commerce website is required to enable such eligibility inquiry—the inquiry and determination may be made on the basis of information scraped from the e-commerce website 102.

With respect to those items that are, in fact, eligible to be the proper subjects of a lease-to-own arrangement, the extension 106 cooperates with the backend platform 108 and perhaps other third-party services 110 to effectuate the lease-to-own arrangement (operation 212). For example, the extension 106 may: (1) present a user interface by which the user may identify himself or herself as an existing user and login to an account maintained by the backend platform 108; (2) retrieve information from the backend platform 108 concerning the user in the event he or she logs in as an existing user, including, for example, his or her open-to-lease line value and remaining open-to-lease line value; (3) determine whether the user has a sufficient remaining open-to-lease line value to permit the eligible goods to be leased; (4) in the event that the user was not a pre-existing customer, present a user interface and interact with the backend platform 108 so as to enroll the user as a customer of the lease-to-own company, and decision that user for a lease-to-own line (and determine whether such line is sufficient to permit the contemplated transaction); (5) interact with the backend platform 108 to retrieve an estimate of the terms of the contemplated transaction, and present such estimated terms to the user via a user interface; (6) optionally offer companion services (example: a damage liability waiver or a benefits package) to the user; (7) interact with the backend platform 108 to retrieve a definitive set of terms of the transaction in view of the user's selection of any aforementioned companion services; (8) interact with the backend platform 108 and optionally a third-party service 110 to create a contract document describing a lease-to-own arrangement for the eligible products pursuant to the aforementioned terms, and present a user interface to present such contract document to the user and permit the user to digitally initial and sign such document; (9) interact with the backend platform 108 or third-party service to store such contract document in the wake of it having been presented to the user for initialization or signature; and (10) interact with the backend platform 108 to obtain reference information, such as a lease identification number, and present such information to the user via a user interface. Note that none of the just-recited steps require interaction with the systems operating the e-commerce website 102.

In the wake of having effectuated the lease-to-own arrangement for the eligible goods (operation 212), the extension 106 initiates a process by which the leased good or goods are purchased by the lease-to-own company from the particular e-retailer operating the website 102, and delivered to the user (operation 214). For example, the extension 106 may initiate an automated process conducted by a remote computing platform (such as the backend computing platform 108) to purchase such goods via the e-commerce website 102 using a payment card titled in the name of the transaction company (example: lease-to-own company), and to have those goods delivered to the user's residence or another location, such as a location determined by the user. (Exemplary embodiments of such a process are disclosed herein, below). Note that the goods may be purchased by the transaction company (example: lease-to-own company) via the e-commerce website 102 without necessitation of any alteration to the website 102, itself, or the systems that operate it.

The upshot of the structure of the system embodiments of FIG. 1 and the method embodiments of FIG. 2 is that all of the operations required for creation of the alternative transaction, itself, and all of the operations required for delivery of the goods or services that are the subject of the alternative transaction, can be performed by the concerted actions of the extension 106, backend platform 108 and (optionally) the third-party service platforms 110—either without involvement of the e-commerce website 102 or the systems that operate it, or via involvement of it in such a way that requires no alteration to the website 102 or the systems that operate it. Hence, no multiparty integration effort is required by a system designed in accord with the principles of FIGS. 1 and 2.

Although FIG. 1 depicts the backend computing platform 108 as being singular, it may be constituted of plural platforms that cooperate to perform the previously described operations. Moreover, the third-party services 110 of FIG. 1 may be performed by the backend platform 108, itself. It is also the case that some of the operations described as having been performed by the backend computing platform 108, itself, may optionally be performed by a third-party platform, such as via consumption of a third-party service 110.

Figure 3:
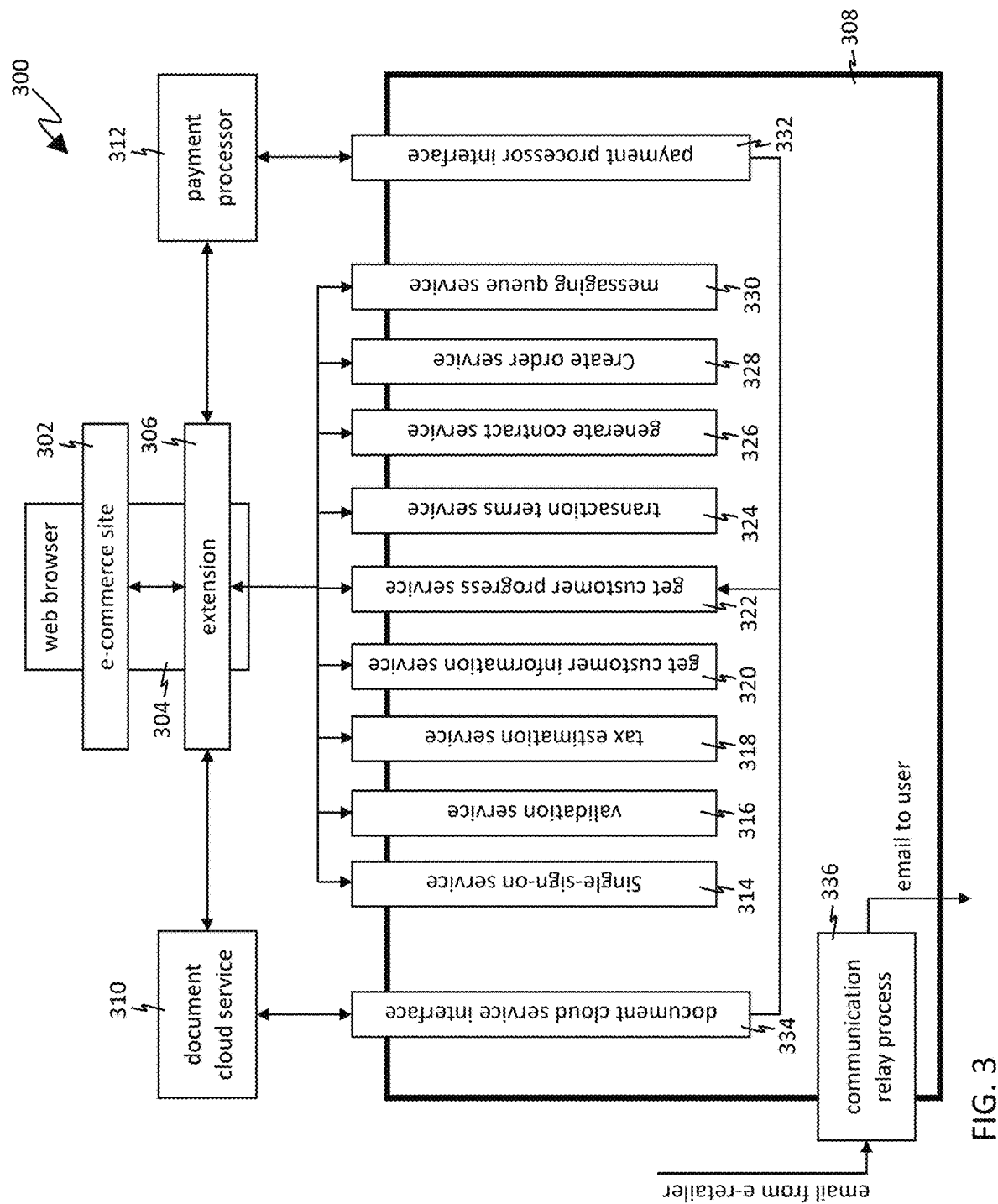
FIG. 3 depicts an exemplary system for introduction of a non-native transaction offering to an e-commerce website, in accordance with certain embodiments.

FIG. 3 depicts exemplary alternative embodiments of the system 100 of FIG. 1. As was the case with respect to system 100 (FIG. 1), the system 300 of FIG. 3 includes an e-commerce website 302 presented to a user via a web browser 304. The system 300 also includes an extension 306 that can interact with the e-commerce site 302, the web browser 304, a backend computing platform 308 operated by or on behalf of a transaction company (example: a lease-to-own company), a document cloud service 310, and a payment processor 312.

In use, the system 300 operates as depicted and described with regard to the methodological embodiments of FIGS. 4A-4G. An example of a customer's use of an e-commerce website 302 is depicted with respect to FIGS. 5A-5S. FIGS. 4A-4G and 5A-5S are referred to alternately in the following discussion.

Figure 5A:
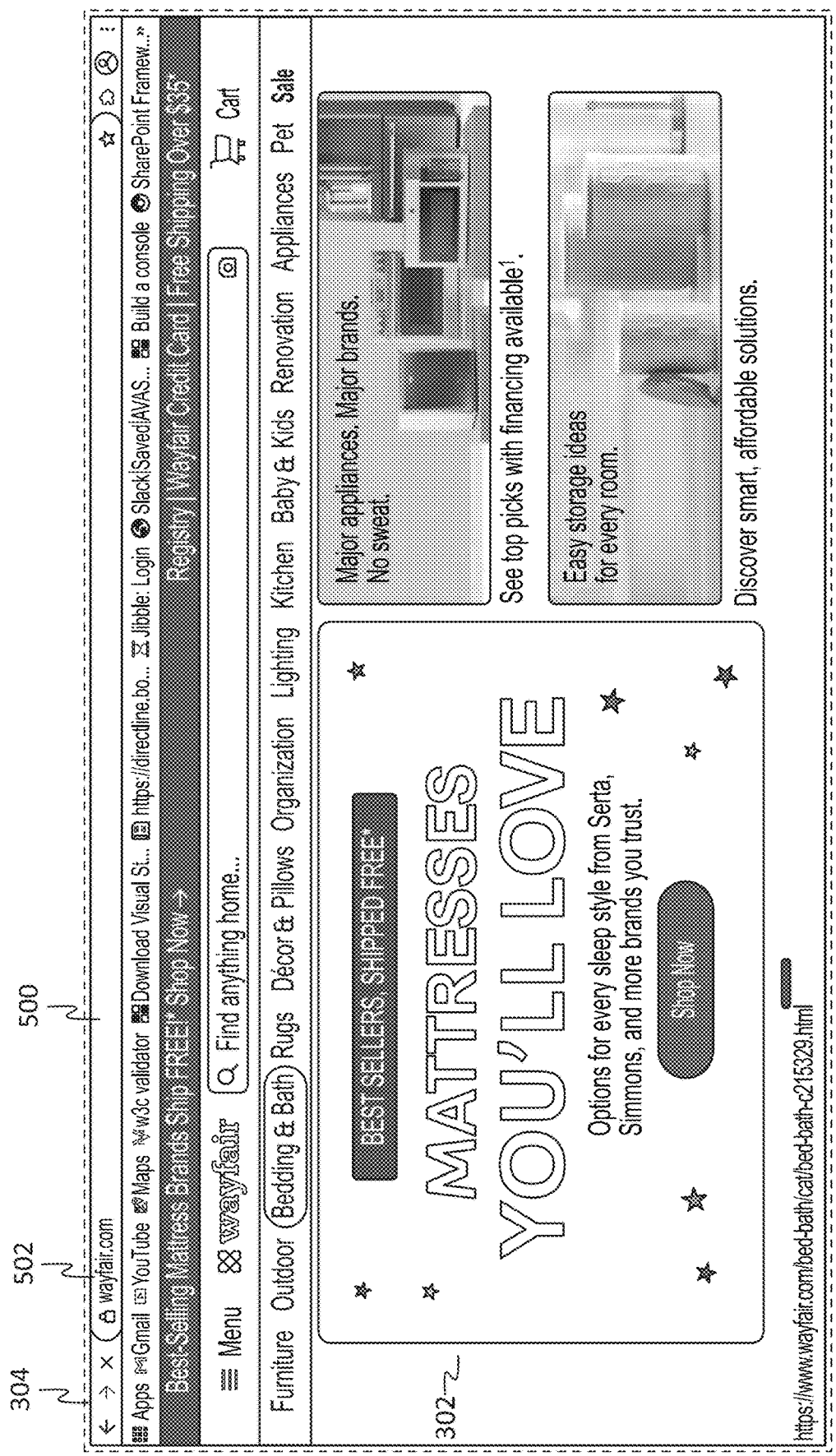
FIGS. 5A-5S depict an exemplary e-commerce website and user interface presented by a browser extension pursuant to the method of FIGS. 4A-4G, in accordance with certain embodiments.
Figure 5B:
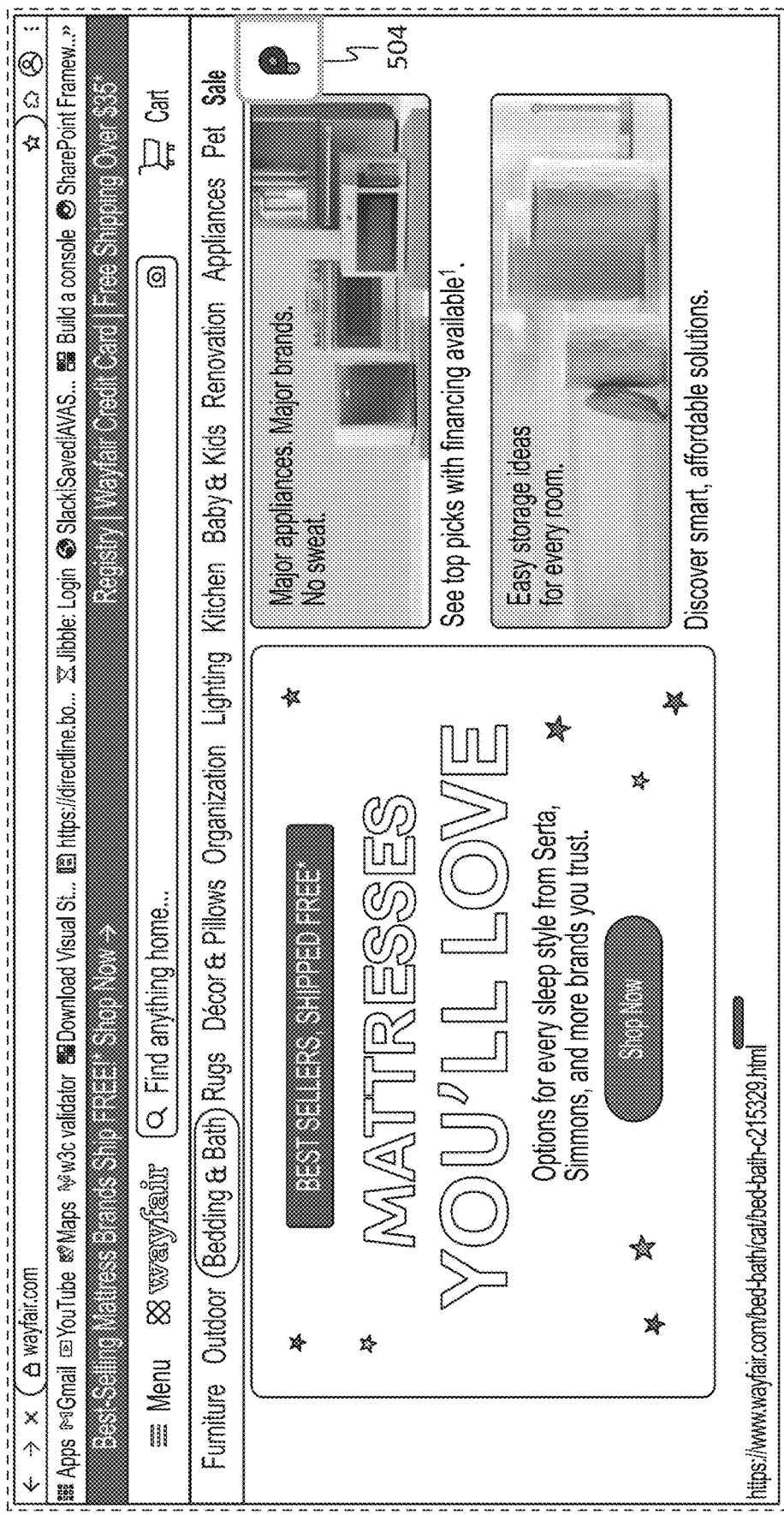

FIG. 5A depicts a web browser 304 that a user has navigated to an exemplary e-commerce website 302. As can be seen from FIG. 5A, the URL bar 500 contains the domain 502 "wayfair.com". The web browser 304 has been configured to launch the extension 306 in response to the particular domain 502 contained within the URL bar 500 being equal to one of plural domains with which the extension 306 is designed to interoperate (example: the extension 306 is launched if the domain 502 is equal to "wayfair.com", "bestbuy.com" or "homedepot.com", and so on). In response to the extension 306 being launched, the JavaScript constituting the extension executes on the JavaScript engine of the web browser 304 and begins to interact with the HyperText Markup Language (HTML) document of the e-commerce website 302. In operation 400, the extension adds an informational button 504 (see FIG. 5B) to the website 302. According to some embodiments, the informational button 504 is added to every page of the website 302 to which the user navigates. According to other embodiments, the informational button 504 is added to only a subset of the pages. For example, the button 504 may be added to only the first page loaded within the targeted domain (in this example, "wayfair.com"), or may be added to only the first x number of such pages, where x is an integer. When the informational button 504 is clicked, such click is detected (operation 402), and an informational window is presented by the extension (operation 404). The informational window (not depicted) explains that a lease-to-own arrangement is offered to the user vis-à-vis certain products marketed via the e-commerce website 302, explains the general nature of a lease-to-own arrangement, explains that the lease-to-own arrangement is being offered by a third-party, as opposed to being offered by the operator of the website 302, and explains that a lease-to-own arrangement is different from outright ownership of a product, among other such informational disclosures. The user may close the information window presented by operation 404 by clicking a "close" button or "X" button, and may re-open it by re-clicking the informational button 504 for so long as it is displayed on the website 302.

Query operations 402, 406, 408 and 410 test for the occurrence of events that may occur as the user navigates the e-commerce website 302. As these events occur, the operations 404, 412, 414, 416, 418 et seq. to which the queries 402, 406, 408 and 410 refer are executed promptly. The extension 306 may embody such operations 404, 412, 414, 416, 418 et seq. as functions or methods that are called invoked upon the occurrence of the events tested for by queries 402, 406, 408 and 410, rather than explicitly tested for.

Figure 5C:
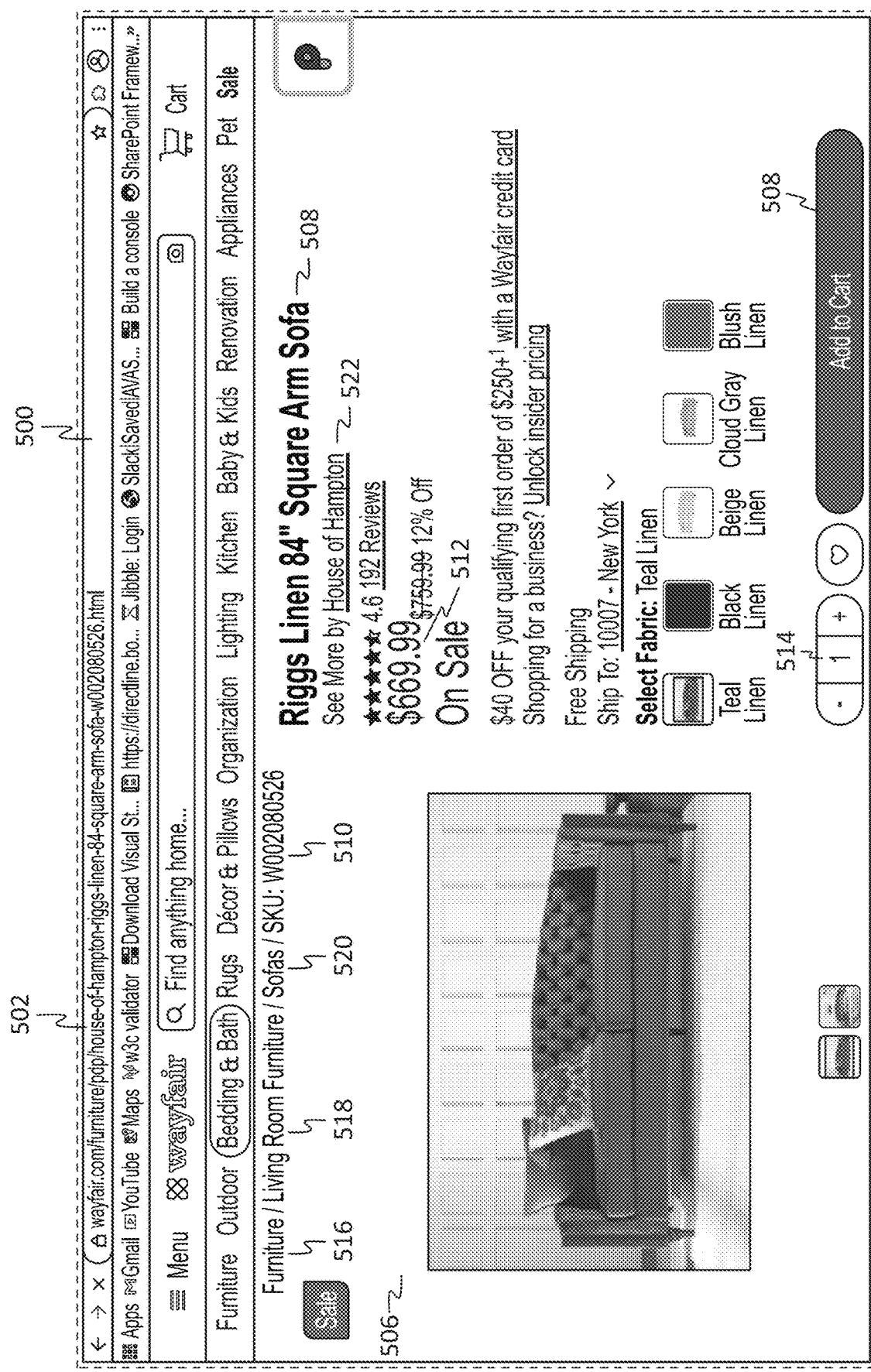

After having navigated to the e-commerce site 302, the user engages in shopping activities and eventually navigates to the product description page 506 depicted in FIG. 5C. The user elects to add the product depicted and described with reference to the page 506 (a sofa) to his or her cart by selecting the "Add to Cart" button 508 native to the e-commerce website 302. The user's click of the "Add to Cart" button 508 is detected by query operation 406, which tests for occurrence of a click of an "Add to Cart" button 508 on a product description page. According to some embodiments, the extension 306 tests for whether or not the website 302 is navigated to a product description page 506 by examining the structure of the URL 502 in the URL bar 500. As can be seen from the example in depicted in FIG. 5C, the URL 502 contains a subdirectory labeled "pdp". The exemplary website 302 is organized such that all product description pages 506 correspond to a URL having a subdirectory labeled "pdp", meaning the extension 306 can test for this condition. A different e-commerce website may exhibit a different condition that the extension 306 should monitor to make this determination. In general, the extension 306 tests for a condition common to product description pages on a given website 302 to determine that the website 302 is navigated to a product description page. Moreover, all product description pages of the exemplary website 302 apply a common class name to the "Add to Cart" button 508, meaning that the extension can test for click events pertaining to buttons identified by the aforementioned class name. Again, the particular attribute commonly assigned to an "Add to Cart" button on any given e-commerce website may vary from website-to-website. In general, the extension 306 tests for click events occurring on elements having an attribute common to the "Add to Cart" buttons 508 on all product description pages of the website 302. Thus, the strategy for implementing query operation 406 begins by determining the particular domain to which the web browser 304 has been navigated. Based upon the domain, the appropriate strategy for identifying that the rendered page is a product description page 506 is invoked, and the appropriate strategy for identifying a click event of the "Add to Cart" button 508 is invoked.

Upon determination that a click event of an "Add to Cart" button has occurred from a product description page, operation 412 is invoked. In operation 412, information pertaining to the product that is the subject of the product description page 506 is scraped. For example, the extension 306 may scrape: product name 508, product shop keeping unit (SKU) 510, product price 512, product quantity 514, a set of category information, such as product category$_1$ 516, product category$_2$ 518, product category$_3$ 520, and product brand 522. As was the case in previous interactions with the HTML document comprising the page 506, the extension first determines the domain of the URL 502 in the URL bar 500. Based on the domain of the website 302 being presented by the browser 304, a domain-specific scraping strategy is employed (domain-specific scraping functions or methods may be contained within the extension 306 and called in the course of scraping operation 412). For example, for a given domain, the extension 306 may examine the HTML document comprising the product detail page 506 to extract elements with a given class name or element ID attribute or other attribute to extract the desired unit of data. (For example, it may be the case that product names across all product detail pages 506 have the same class name or element ID attribute or other attribute, meaning that to scrape the product name, the extension 306 need only extract the element identified by the aforementioned class name or element ID attribute or other attribute.) In addition to using the domain of the URL 502 in the URL bar 500 to determine the scraping strategy to be used to extract each particular unit of data, the domain may be used to determine which units of data are available to be extracted from a given e-commerce website 302. For example, some websites may only have one or two levels of product category data, meaning that the extension 306 would only scrape product category$_1$, or product category$_1$ and product category$_2$ when scraping from a given site. According to some embodiments, in the event that a given product is associated with more than a certain threshold quantity of categories (example: three categories), a quantity of categories no greater than the aforementioned threshold are scraped for each given product, beginning with the highest-level category. (Example: assume a sound bar is associated with categories such as "audio" (category$_1$), "home audio" (category$_2$), "speakers" (category$_3$) and "sound bars" (category$_4$), then only category$_1$, category$_2$ and category$_3$ would be scraped). For the sake of clarity, the term "highest level category" refers to the broadest category ("audio"), while the next highest-level category refers to the next broadest category ("home audio"), and so on.

In the wake of having scraped the product data (operation 412), the extension 306 constructs a product object corresponding to the product that is the subject of the product detail page 506. Thus, a first unit of scraped data (example: product name) is assigned to a first attribute of the aforementioned product object, and a second unit of scraped data (example: product SKU) is assigned to a second attribute of the aforementioned product object, and so on. The product object may also include other data obtained from the web browser 304 as opposed to having been scraped from the e-commerce website 302, such as the particular URL corresponding to the product detail page of the product described by the product object. After having constructed the product object, the product object is added to a product object array that is stored in local memory in the browser, such as by use of the sessionStorage API (operation 414). Thus, there is one product object stored in the product object array for each product that was added to the cart by virtue of the user having clicked the "Add to Cart" button 508 from a product detail page.

According to some embodiments, the various scraping strategies pertaining to various e-commerce domains are hard-coded into the extension 306, itself. According to other embodiments, the extension 306 uses the domain (or a value derived therefrom such as a retailer ID, discussed later) to retrieve the scraping strategy from a remote computing platform, such as backend platform 308. For example, the extension 306 may call the backend platform 308 with a retailer ID identifying the particular e-commerce site 302 to be scraped, and the platform 308 may respond with an array or other data structure identifying the particular class name associated with a given unit of product data to be scraped. These embodiments have the advantage of providing flexibility in the event that the operator of the e-commerce website 302 alters the structure of the site 302 so as to disrupt the present-tense scraping strategy. The scraping strategy can simply be updated at the remote computing platform, and the extension will scrape pursuant to the updated strategy without necessitation of updating the extension 306, itself.

After having navigated to product detail page 506 and adding the sofa to the digital shopping cart, the user next navigates to the product detail page 507 shown in FIG. 5D. The user once again adds the product that is the subject of the product detail page 506 (an end table) to the digital shopping cart by clicking the "Add to Cart" button 509, and the extension once again responds by detecting a click event on an "Add to Cart" button 509 on a product detail page 507, and traversing operations 412 and 414, thereby scraping the relevant product data, constructing a product object and saving the product object in the aforementioned product object array, meaning that pursuant to this example, the array now has two objects within it.

Figure 5E:
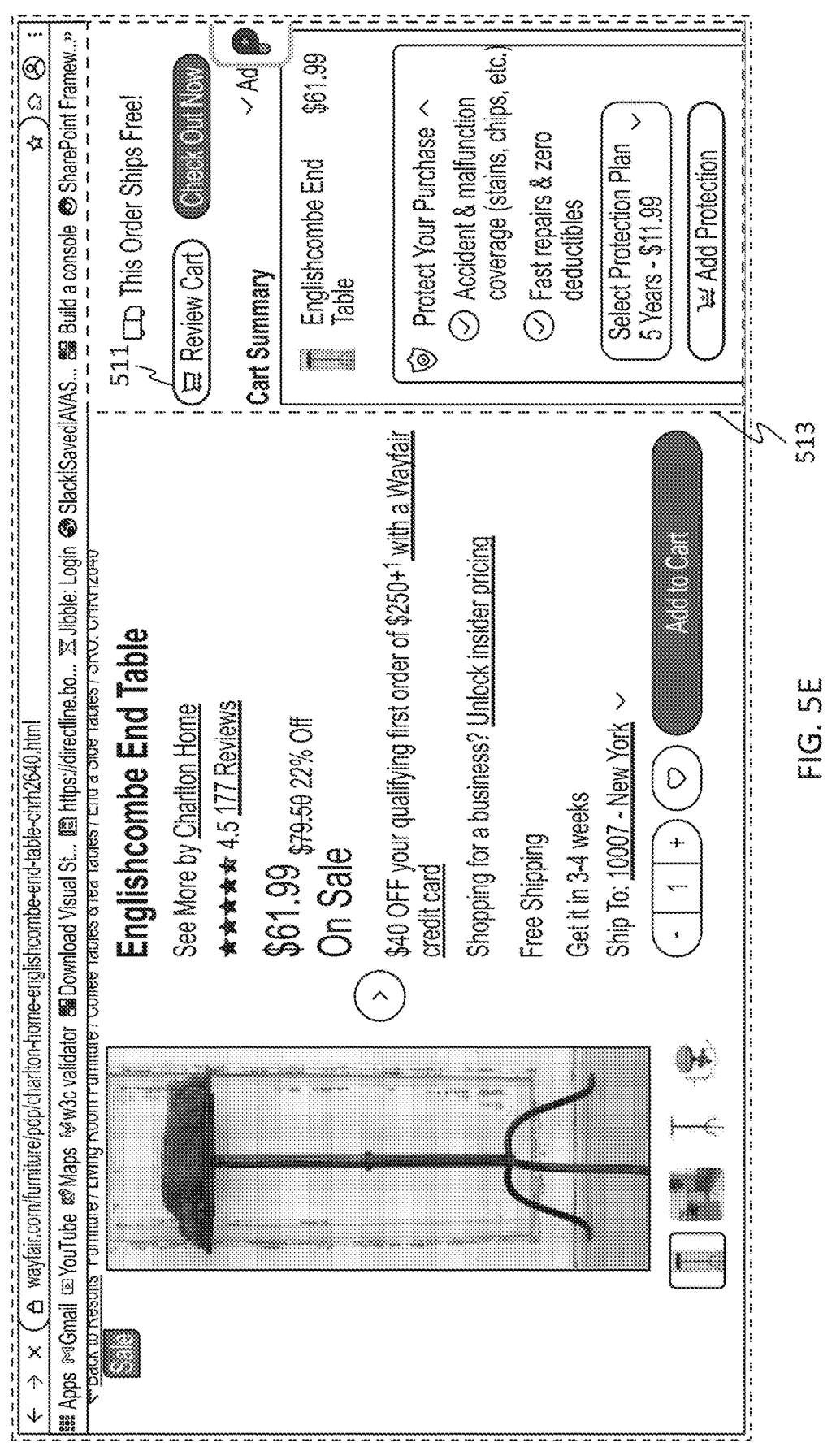

As a consequence of having clicked the "Add to Cart" button 510, the product description page 508 presents a sidebar 513 that displays the item just added to the cart, i.e., the end table (see FIG. 5E). The sidebar 513 includes a "Review Cart" button 511, which the user clicks, causing the website 302 to load and display the entry point page for the digital shopping cart (see FIG. 5F).

When the entry point page of the shopping cart is loaded, the URL 502 in the URL bar 500 is "wayfair.com/v/checkout/basket/show". Loading of the shopping cart is detected by the extension 306 (query operation 408) by virtue of testing the URL 502 against the string known to be equal to that of the shopping cart for the wayfair.com domain. Thus, operation 408 is uniquely structured for each e-commerce site 302 with which the extension 306 interoperates. In other words, the extension 306 examines the domain of the URL 502 and determines what string the URL 502 should be tested against with the occurrence of each page load in order to determine whether the shopping cart has been entered. For the "wayfair.com" domain, the aforementioned string will equal one particular value (i.e., "wayfair.com/v/checkout/basket/show"), while for the "bestbuy.com" domain, the aforementioned string would equal another value (e.g., "bestbuy.com/cart"), and so on.

As a consequence of the extension 306 detecting the load of the shopping cart in query operation 408, operational flow is passed to operation 416. In operation 416, a transactional button 515 is added to the shopping cart page by the extension 306. In the particular example depicted in FIG. 5F, the transactional button 515 reads "Preferred Lease Checkout" which indicates to the user that a lease-to-own arrangement offered by Preferred Lease can be sought vis-à-vis the items in the cart (the sofa and end table) by clicking the button 515. Operation 416 is unique to each particular e-commerce site 302 with which the extension 306 interoperates. The extension 306 examines the domain 502, and in the context of the particular example being discussed presently, determines that the domain is "wayfair.com." Based upon the domain, the extension calls a particular function or method that is structured to introduce the transactional button 515 on to the shopping cart page of the Wayfair e-commerce website 302. According to some embodiments, the extension 306 includes a plurality of such functions or methods, each of which corresponds to one particular e-commerce website 302 with which the extension 306 is intended interoperate (example: one such function or method for the "wayfair.com" domain, another such function or method for the "bestbuy.com" domain, and so on). As can be seen from FIG. 5F, the function or method adds the button 515 in such a manner that it does not overlap other native elements of the shopping cart page, and is intuitively located from the perspective of the user.

Figure 4A:
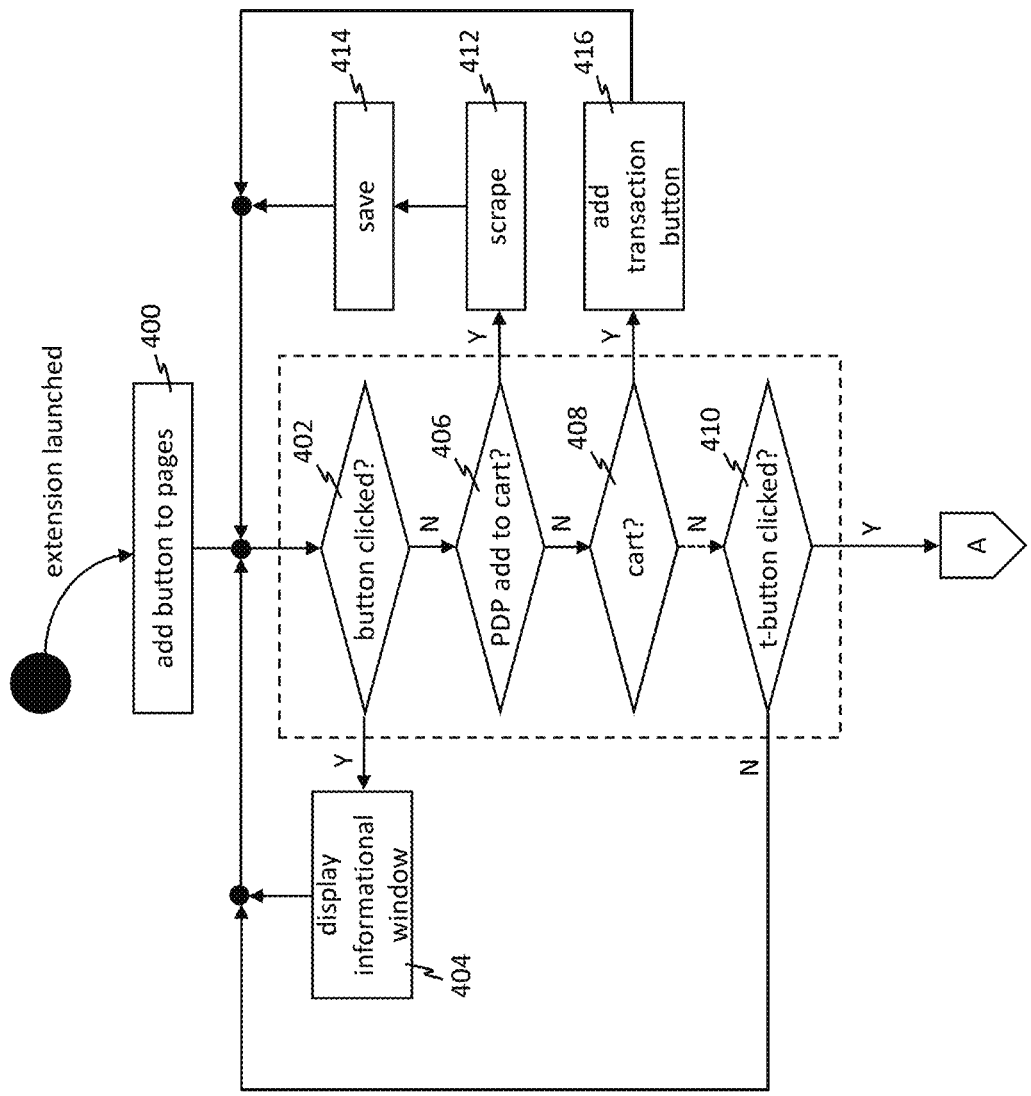
FIGS. 4A-4G depict an exemplary method carried out in connection with the system of FIG. 3, in accordance with certain embodiments.
Figure 4B:
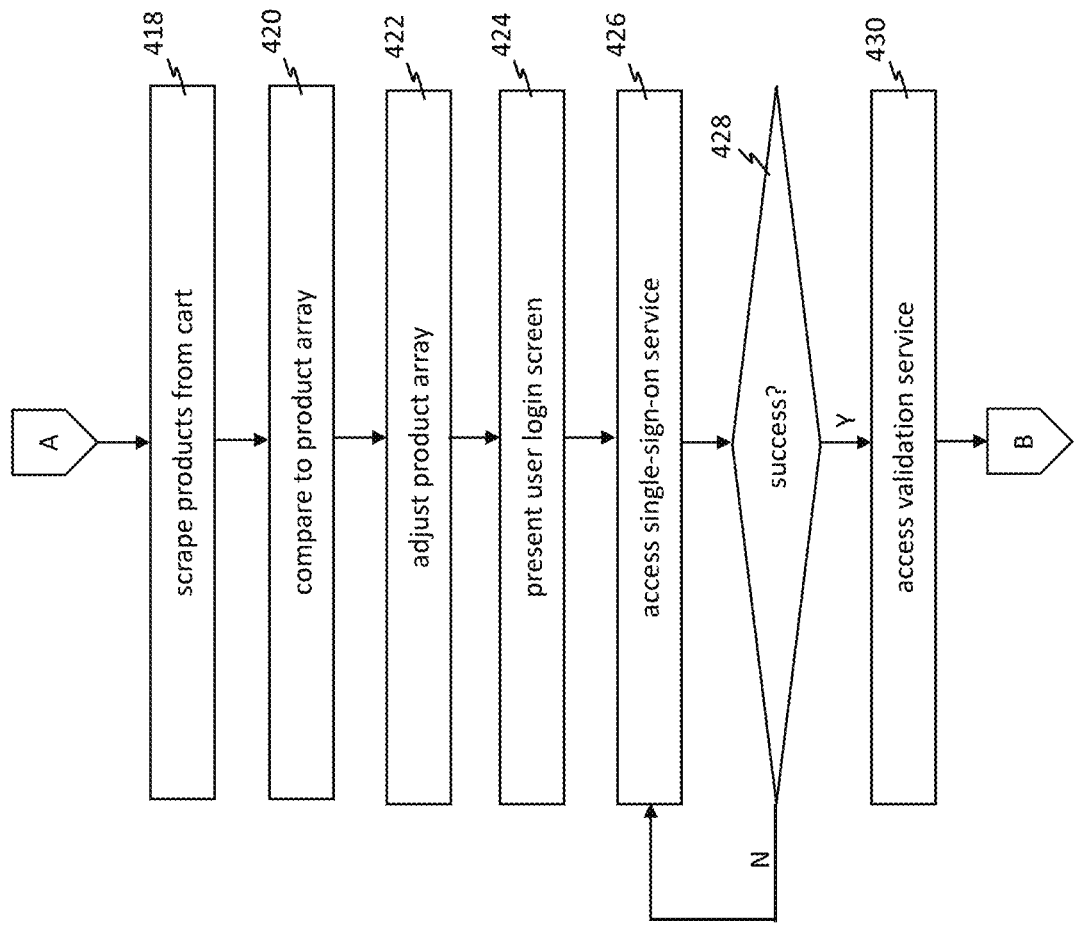
Figure 5F:
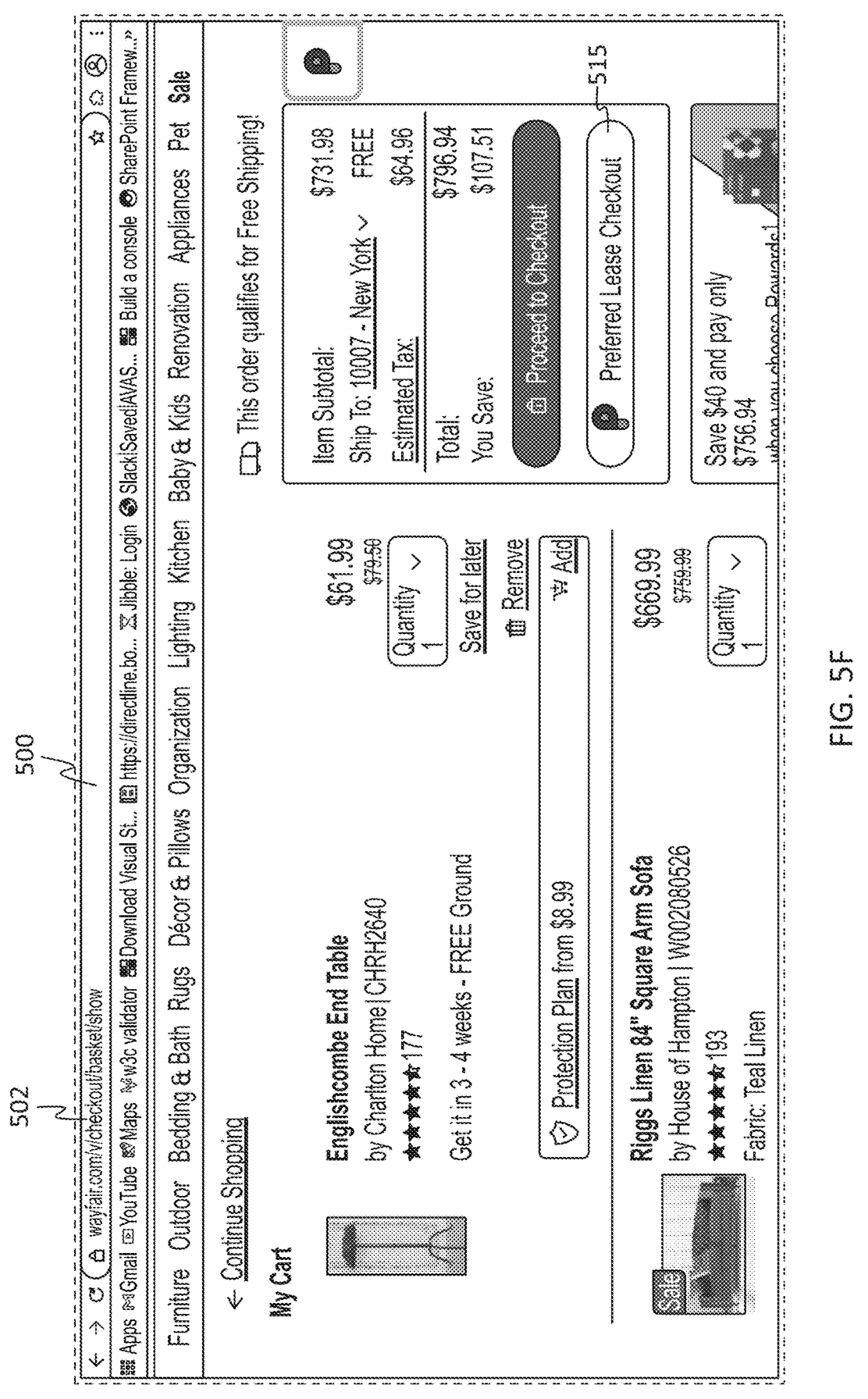

Continuing on with the exemplary use case presently being discussed, the user clicks the transactional button 515, and the click event is detected by query operation 410, causing operational flow to transition to operation 418 (FIG. 4B). In operation 418, the extension 306 scrapes the product information from the shopping cart page depicted in FIG. 5F. Recall: the extension is structured to add a product object to the product object array only in the event that the user clicks an "Add to Cart" button (such as button 510 depicted in FIG. 5D) from a product detail page (such as product detail page 508 depicted in FIG. 5D). The e-commerce website 302 may contain "Add to Cart" buttons on pages other than its various product detail pages. Should the user click an "Add to Cart" button located on one of those other pages, the extension 302 as depicted in FIGS. 4A-4G does not respond by adding a product object to the product object array. The reason for this is that, given the structure of the particular e-commerce website 302 that is the subject of this example, the other pages from which the user may have clicked an "Add to Cart" button contain considerably less product information, meaning that scraping operation 412 (FIG. 4A) could not extract much information for creation of a product object if it were called in response to click events on "Add to Cart" buttons location on such other pages. For example, such other pages may not present a product SKU or product categories, and so on, meaning that those particular product objects attributes would not be populated by the extension 306 and would therefore contain no data. To accommodate a strategy in which scraping is performed only in response to click events on "Add to Cart" buttons located on product detail pages, the extension 306 is structured to scrape (operation 418) product data from the shopping cart page (FIG. 5F). The result is that a more consistent quantity of product data is extracted from product-to-product within the shopping cart. For example, according to some embodiments, the product data may be entirely consistent with the exception that, in the context of certain e-commerce sites, product category information may be excluded from the HTML document comprising the shopping cart page, meaning that the scraping operation 418 is unable to extract such information. According to some embodiments, the extension does, in fact, respond to a click event of "Add to Cart" buttons located on pages other than product detail pages by initiating execution of operations 412 and 414. Scraping operation 418 functions similarly to the scraping operation 412 of FIG. 4A (strategy varies from site-to-site, and is based on class names, element ID's, or other attributes known to accompany the sought-after information), and for the sake of brevity is not re-described here.

In the wake of having scraped the product data from the cart (and organized it into one or more product object—one such object for each item in the car), the just-scraped data is compared to the product object array (operation 420). The purpose of operation 420 is to: (1) account for objects that may have been removed from the cart after having been added by virtue of a user having clicked an "Add to Cart"

button from a product detail page—note that as presented in FIG. 4A, the extension 306 adds product objects to the product object array but does not contain operations to remove such objects from the array; and (2) to account for any products that may have been added to the cart by virtue of the user having clicked on an "Add to Cart" button located on a page other than a product detail page. Thus, in operation 422 the extension 306 adjusts the product object array to reflect the items actually contained in the digital shopping cart: it removes any product objects that are in the array but not present in the dataset generated from scraping the cart (operation 418), and adds product objects to the array for any objects present in the dataset generated from operation 418 but not already present in the product object array.

Figure 5G:
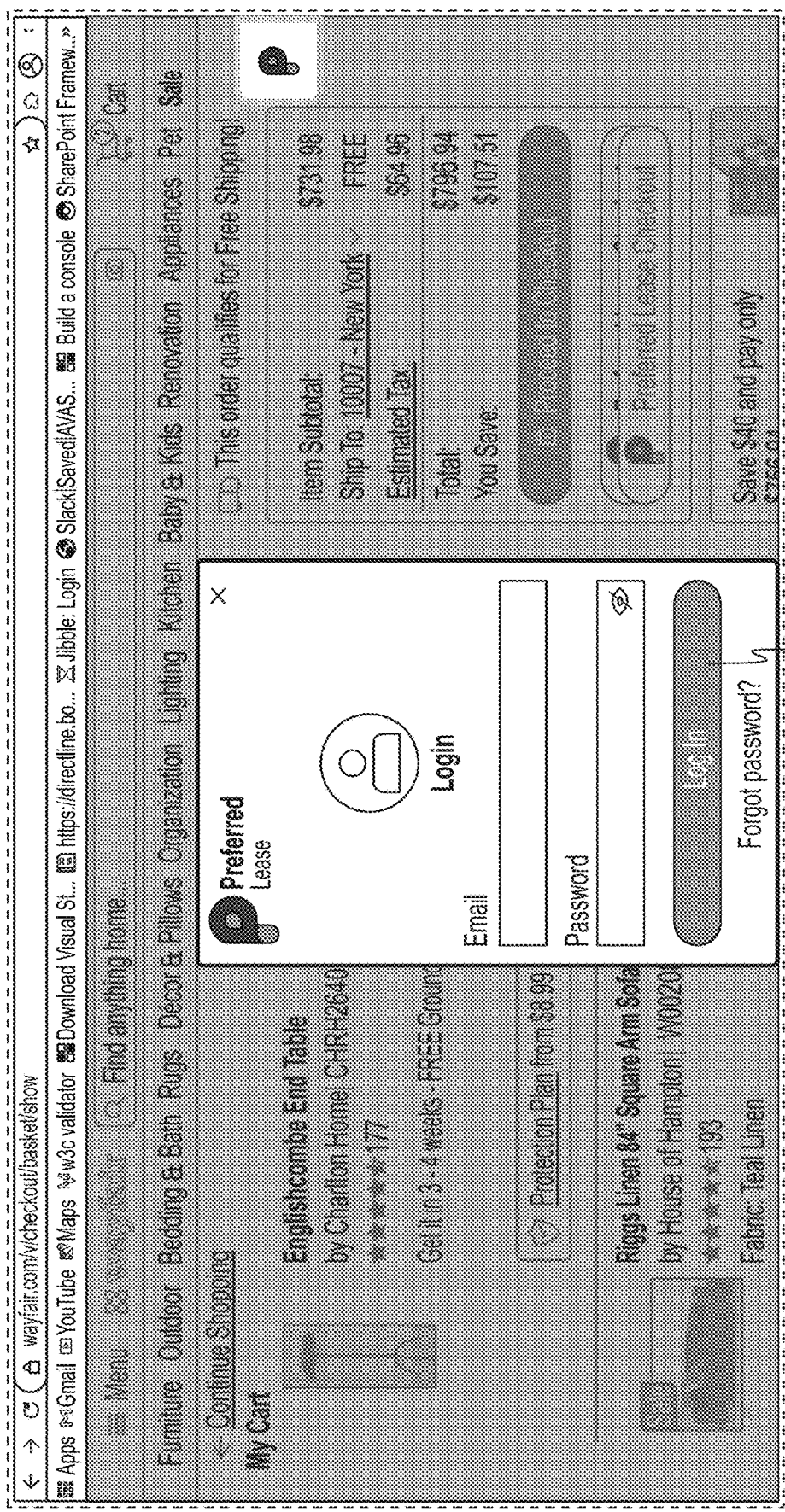
Figure 5H:
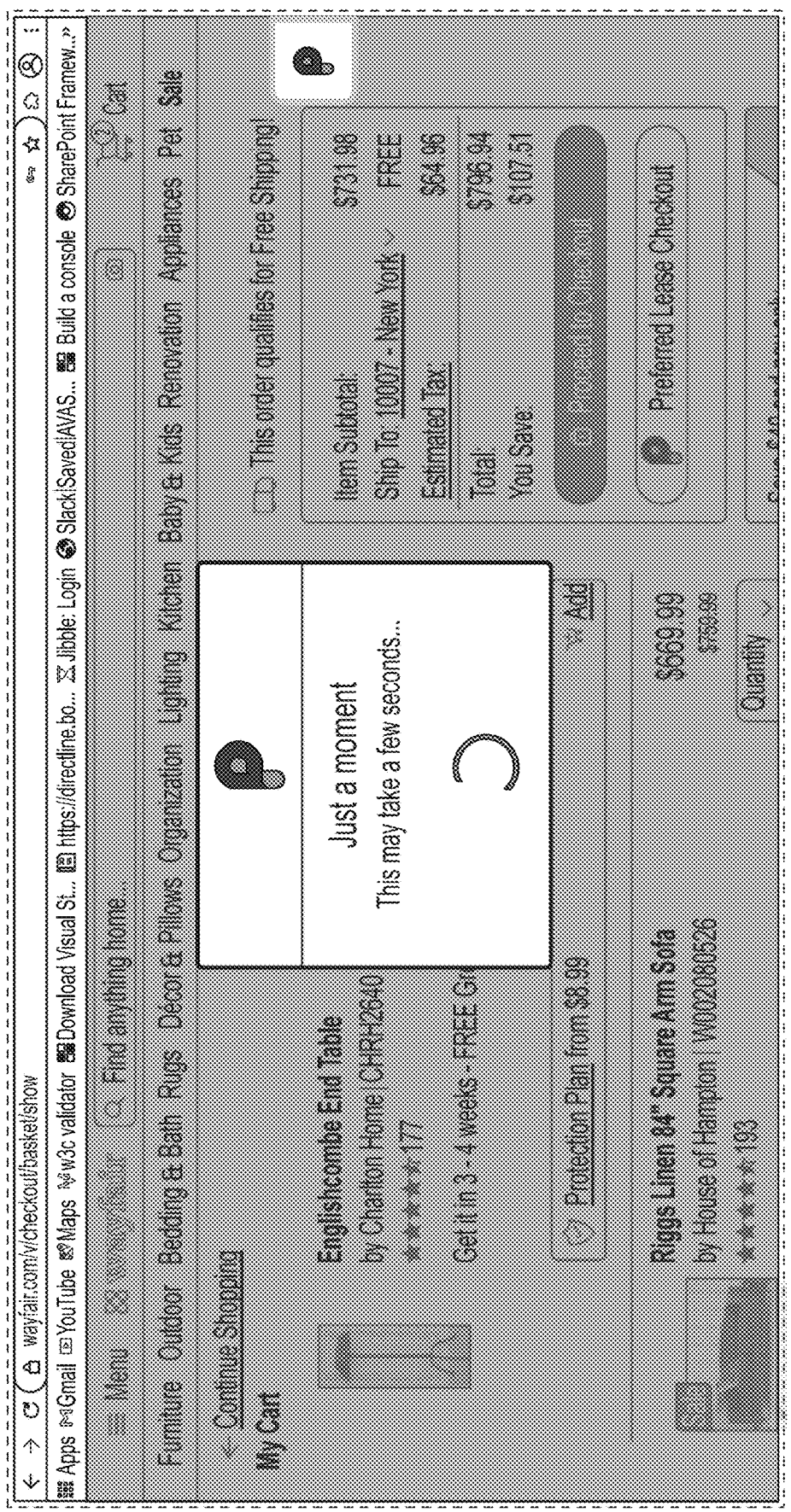
Figure 51:
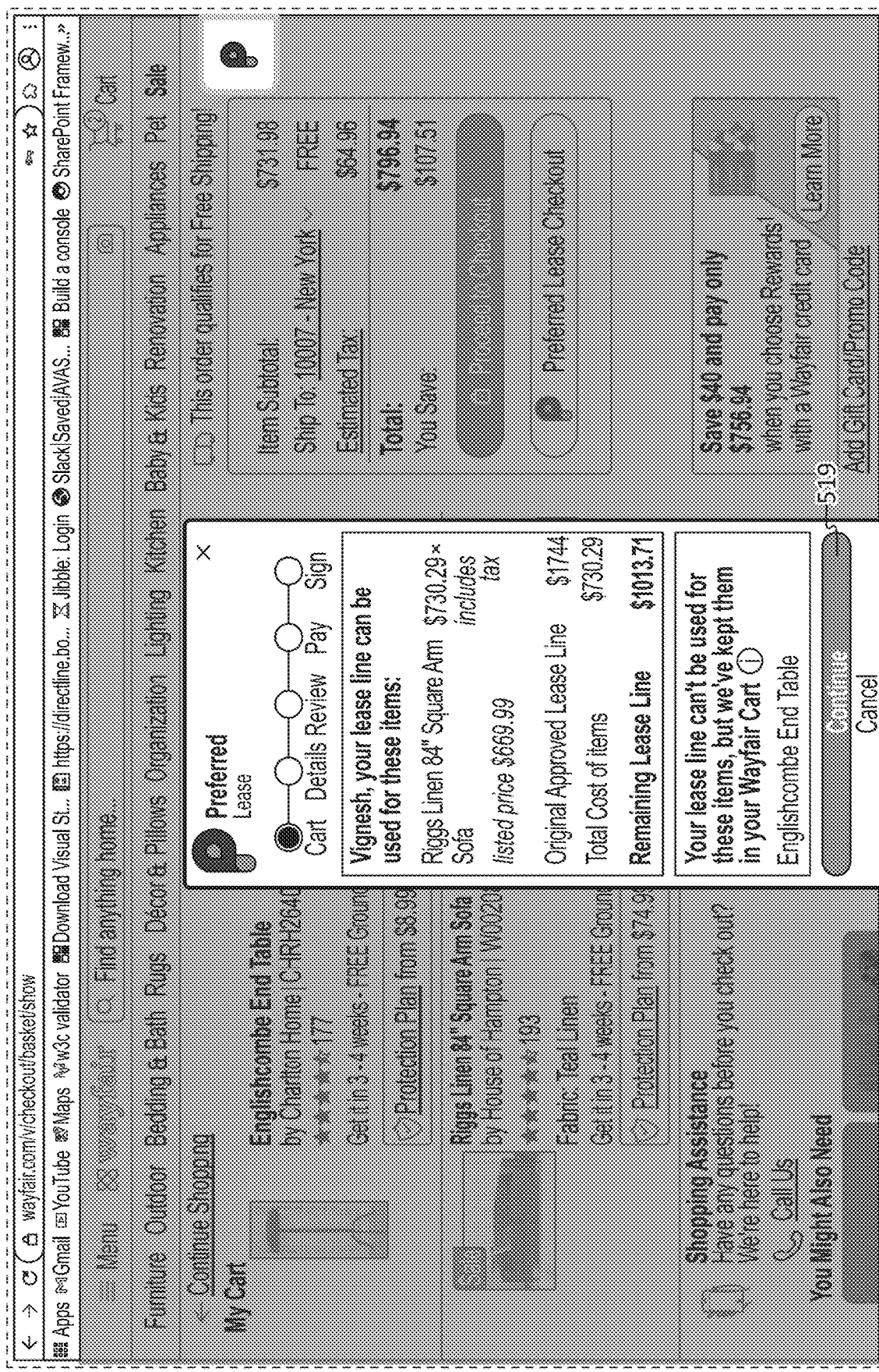

In the wake of having performed adjustment operation 422, the extension 306 presents the user with a login screen, depicted in FIG. 5G. Continuing on with the exemplary use case, the user enters his or her login credentials into the screen of FIG. 5G and clicks the "Login" button 517. In operation 426, the extension 306 responds by accessing a single-sign-on service 314 executing on the backend computing platform 308 and exposed to a network such as the Internet via an API (example: the service 314 may be a web service exposed via a RESTful API, for example). (The backend platform 308 exposes other services 316-334, discussed below, which may also be configured as web services exposed via RESTful APIs, or otherwise made available for access by the extension 306 via a network connection.) The extension 306 sends the login credentials entered by the user to the aforementioned service 314, which responds with: (1) an indication of success or failure of the login attempt; and, (2) assuming a successful login attempt, a global unique identification number (GUID) identifying the user to the various data systems making up the backend computing platform 308. (While operation 426 is being performed, the "Just a Moment" screen of FIG. 5H is presented to the user; the screen of FIG. 5H continues to be presented to the user during the execution of operations 428-436.)

Next, in operation 428, the response of the single-sign-on service 314 is examined by the extension 306, and if the response indicates a failure, the extension 306 does not permit advancement beyond the login screen of FIG. 5G. On the other hand, if the response of the single-sign-on service 314 indicates a success, then control is passed to operation 430. In operation 430, the extension 306 accesses a validation service 316 executing on the backend platform 308. The purpose of the validation service 316 is to return a determination, for each product object within the product object array, pertaining to whether or not such product object corresponds to a product that is eligible for the sought-after transaction (in the context of this example, a lease-to-own arrangement). The extension 306 sends the product object array and an indication of the particular e-commerce site 302 from which the extension 306 scraped the product array (for example: the extension 306 may send the domain name of the e-commerce site or a retailer ID, such as an integer that that uniquely identifies the e-commerce site 302) to the validation service 316, such as via a JavaScript Object Notation (JSON) message, and the service 316 responds by returning the product object array with an indication—on a product-object-by-product-object basis—of whether each product in the cart is eligible to be the subject of a lease-to-own arrangement with the lease-to-own company. The operations related to the validation service 316 are discussed in greater detail, below.

In the wake of having accessed the validation service 316 (operation 430), the extension 306 accesses a tax estimation service 318 executing on the backend platform 308. The extension sends the GUID and product object array to the tax estimation service 318, and, supplied with residency information pertaining to the user (obtained by the service 318 by virtue of accessing the user's account information with the GUID), and further supplied with the price of each product based on the information in the product array, the service 318 responds with an estimate of the various taxes (example: sales tax, use tax, and so on) on a product-by-product basis, for each product that was indicated as being eligible for a lease-to-own arrangement during operation 430.

Next, in operation 434, the extension accesses a get-customer-information service 320 executing on the backend computing platform 308. The extension sends the service 320 the aforementioned GUID identifying the user, and the service 320 responds by returning information pertaining to the user, including: the user's open-to-lease line (which indicates the aggregate value of products, including tax, that the lease-to-own company is willing to spend to purchase eligible goods which are then leased by the lease-to-own company to the user), the amount of the user's lease-to-own line that remains available to fund future lease arrangements, the user's address, telephone number, and a lease ID identifying the contemplated lease transaction to the various data systems making up the backend platform 308. The information returned by the service 320 is converted into a customer object with object attributes equal to the various units of customer data returned by the service 320, and the customer object is stored (operation 436). According to some embodiments, the customer object is stored using the JavaScript sessionStorage API.

In the wake of having completed operation 434, the extension 306 constructs and presents the custom cart screen depicted in FIG. 5I (operation 438). As can be seen from FIG. 5I, the screen contains data developed or obtained during execution of operations 430-434. The screen presents: (1) an indication of which particular items are eligible to be the subject of the contemplated lease-to-own arrangement (i.e., the sofa)—derived from operation 430; (2) the price of each such eligible item that is applied against the user's open-to-lease line, grossed up to include the tax estimate—derived from operation 432; (3) the user's open-to-lease line (in this case equal to the user's remaining open-to-lease line in advance of the contemplated transaction and therefore not presented separately from the user's pre-transaction remaining open-to-lease line)—derived from operation 434; (4) the total cost that is applied against the user's open-to-lease line (including tax estimations) of all products eligible to be the subject of the contemplated lease-to-own arrangement, which is calculated by the extension 306 by summing each of the aforementioned grossed-up prices of each of the eligible products; (5) the user's remaining open-to-lease line in the wake of the contemplated lease-to-own transaction, which is calculated by subtracting the aforementioned total cost described with reference to the fourth item in this list from the user's open-to-lease line; (6) with respect to the eligible item(s), the lease rate, initial lease term, and total cost to the user if the user renews the lease for a sufficient duration to ultimately obtain ownership, along with other consumer disclosures; and (7) an indication of which particular items are ineligible to be the subject of the contemplated lease-to-own arrangement (e.g., a consumable item or an item having a price that fails to exceed a threshold price for eligibility), meaning that the user will have to purchase the ineligible items if he or she is intent on obtaining them, because the lease-to-own company will not agree to lease those products to the user—this list of items (in this case, only a single such item) is derived from operation 430. Carrying on with the exemplary use case, the user reviews the information presented via the custom cart screen of FIG. 5I, and then clicks the "Continue" button 519 (depicted, for the sake of clarity, as operation 440, although it is an act performed by the user, as opposed to an action performed by the extension 306—other actions of the user are presented in the operations flow of FIGS. 4A-4G for the sake of clarity).

In response to the user clicking the "Continue" button 519, the extension 306 presents the "Just a Moment" screen of FIG. 5H, and accesses a transaction-terms service 324 executing on the backend platform 308 (operation 442). The extension 306 communicates to the transaction-terms service 324 a dataset that is sufficient for it to determine the transaction terms. Thus, in the context of the present lease-to-own example, the extension 306 communicates the product name, product categories (if they are known), product price, the aforementioned lease ID. According to some embodiments, the lease-to-own company may offer companion services that the user may elect to purchase in connection with his or her lease of eligible products. For example, the lease-to-own company may offer a limited damage waiver (to protect the user against costs that may arise from certain varieties of damage to the leased goods, should it be the case that the user were to terminate (i.e., not renew) the lease prior to obtaining ownership of the goods, and would therefore be returning damaged goods), or may offer a benefits package to the user. In the context of such embodiments, the extension 306 also communicates to the transaction-terms service 324 that the user desires to purchase both such companion services. The service 324 replies with the terms under which the transaction company will offer the transaction, which in the context of the current exemplary lease-to-own arrangement, include: (1) a monthly (or other offered short term lease renewal basis) lease payment estimate (example: a monthly payment of $133.89); (2) term of all lease renewals, if elected by the user, to obtain ownership over the product (example: 12 monthly payments); (3) the total cost to the user if the user renews the lease for a sufficient duration to ultimately obtain ownership; and (4) for each companion service, a monthly price and tax associated therewith (example: monthly cost of $12.28 for the limited damage waiver, plus tax of $1.11, and a monthly cost of $11.92 for the benefits package, plus tax of $1.07).

Figure 5J:
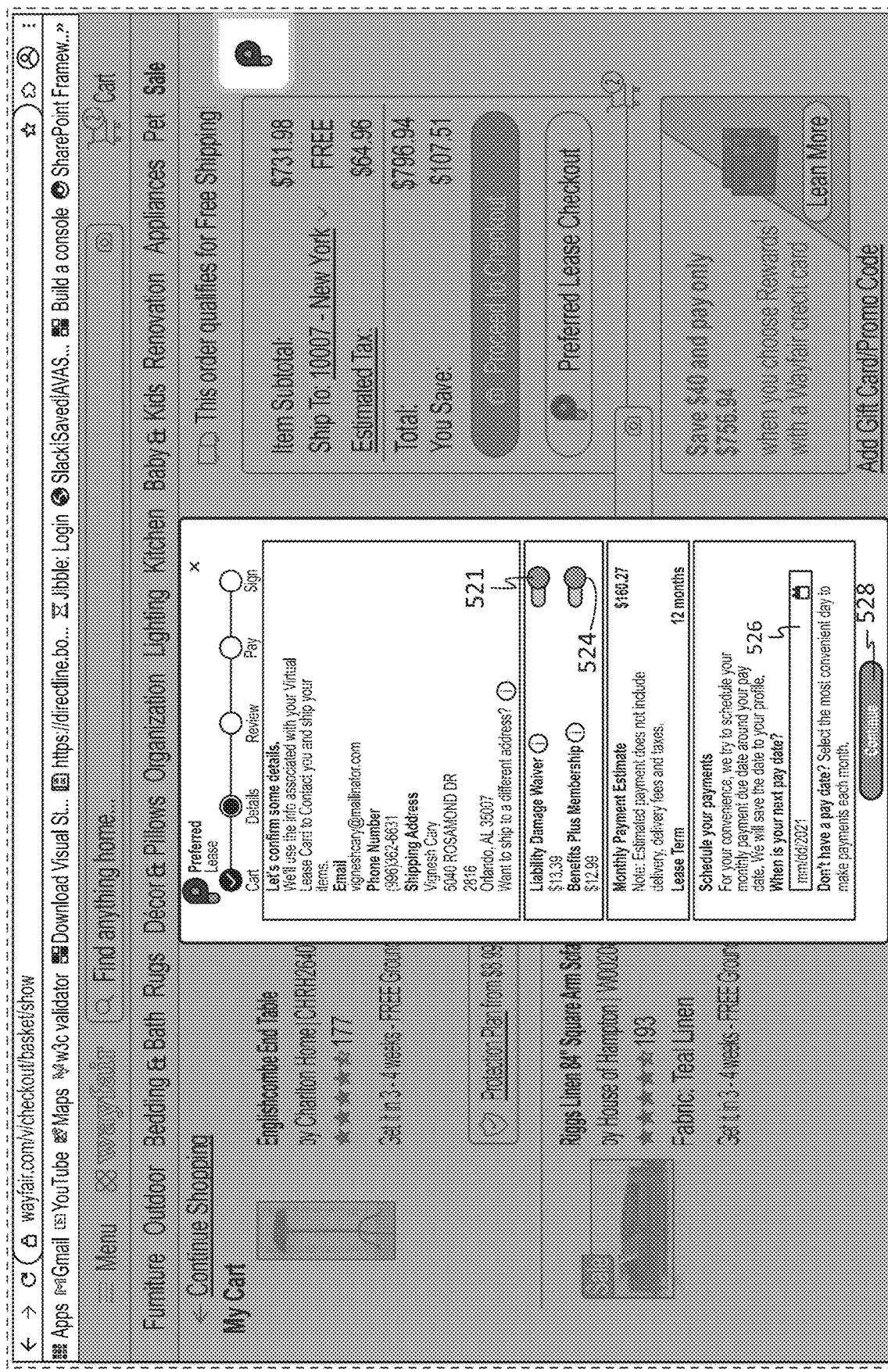

In the wake of receiving the response from the transaction-terms service 324, a transaction details screen, such as the one depicted in FIG. 5J, is constructed and presented by the extension (operation 444). The transaction details screen presents: (1) the email address to which communications pertaining to the leased products will be sent—obtained during operation 434; (2) the phone number that the lease-to-own company would call in connection with any issues related to the contemplated lease-to-own arrangement—obtained during operation 434; (3) the address to which the leased items will be shipped—obtained during operation 434; (4) a pair of toggle buttons 521 and 524 by which the user may indicate his selection of either companion service—toggled on during the initial presentation of the transaction details screen, according to some embodiments; (5) an estimate of the monthly (or other short term lease renewal basis) lease payment that the user would owe, if the user elects to renew the lease and companion services each term, assuming the companion service selection indicated by the toggle buttons—$160.27=$133.89 monthly cost for the sofa+$12.28 monthly for the limited damage waiver+$1.11 monthly tax on the limited damage waiver+$11.92 monthly for the benefits package+$1.07 monthly tax for the benefits package). The aforementioned estimated monthly payment is adjusted by the extension 306 as the user toggles the toggle buttons 521 or 524 (operations 446 and 448). For example, if the user were to de-select toggle button 524 (related to the benefits package), then the extension 306 would re-calculate the estimated monthly payment as: $147.28=$133.89 monthly cost for the sofa+$12.28 monthly for the limited damage waiver+$1.11 monthly tax on the limited damage waiver. The transaction details screen of FIG. 5J also contains a user input element 526 by which the user may indicate his next pay date. The user's pay date may be used to determine the particular date within each month upon which the user's payments will be due. This date will be stated in a transaction agreement (example: lease-to-own agreement)—discussed herein, below.

Continuing on with the exemplary use case presently being discussed, the user indicates his next pay date using user input element 526 (operation 450), and then clicks the "Continue" button 528 (operation 452). In response, the extension stores the payment date entered via user input element 526 as a payment date object (operation 454). According to some embodiments, the payment date object is stored using the JavaScript sessionStorage API. Thereafter, the extension 306 re-accesses the aforementioned transaction-terms service 324, this time communicating to it the user's actual selection of companion services, as indicated by toggle buttons 521 and 524 (operation 456). The service 324 replies with the monthly lease payment, the initial terms of the lease, the term of the lease assuming the user elects to renew the lease for all required terms to ultimately obtain ownership of the product, an application fee associated with the contemplated transaction, and, for each selected companion service (if any), a monthly price and tax associated therewith. According to some embodiments, the extension presents the "Just a Moment" screen of FIG. 5H during the execution of operations 454 and 456.

Figure 5K:
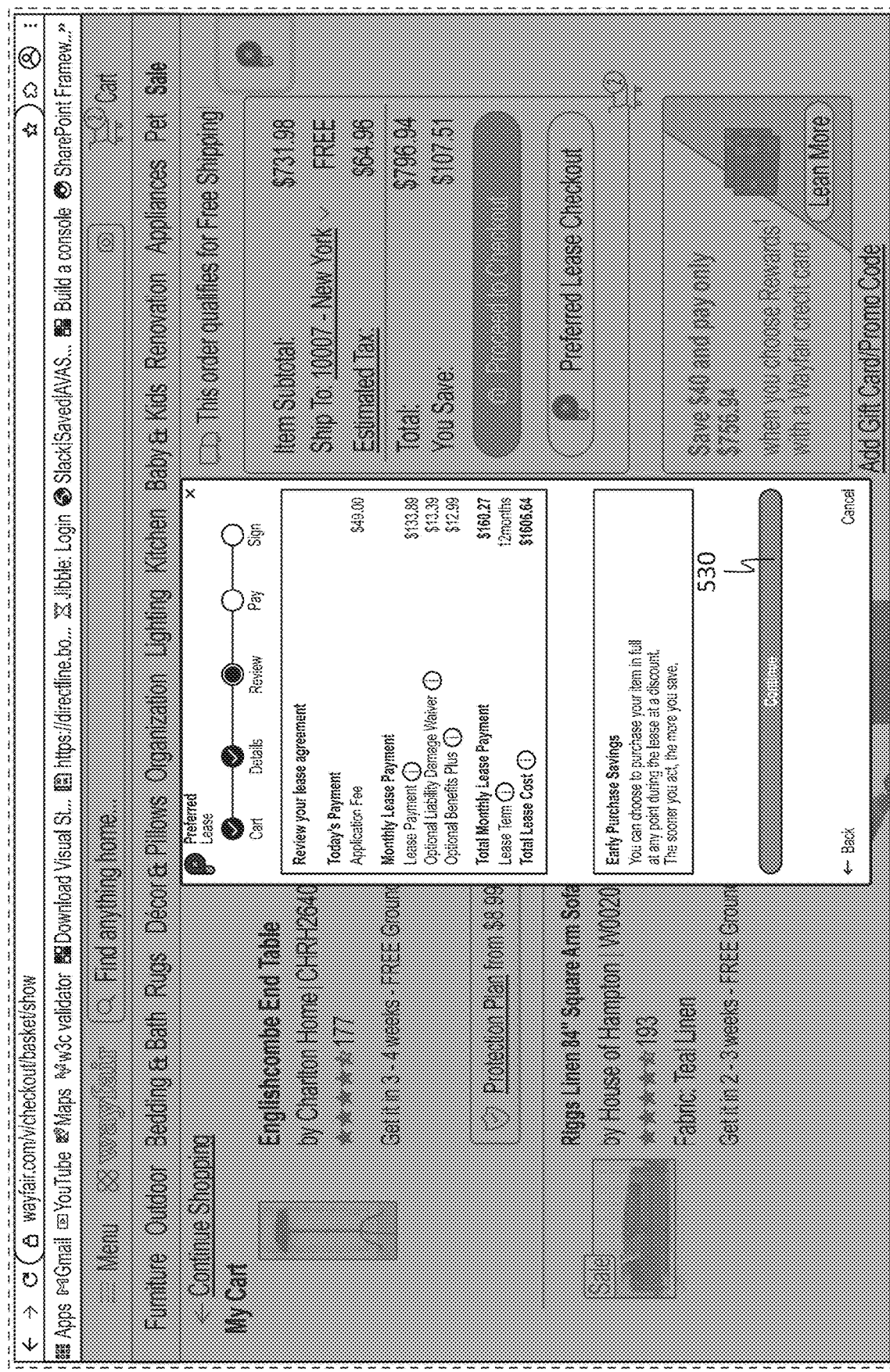

Next, in operation 458, the extension uses the information returned from the transaction-terms service 324 in operation 456 to construct and present the review-of-terms screen depicted in FIG. 5K. As can be seen from FIG. 5K, the screen presents: (1) the application fee or initial lease payment retrieved from the transaction-terms service 324 in operation 456 (i.e., $49 in the exemplary screen depicted in FIG. 5K); (2) the monthly lease payment retrieved from the transaction-terms service 324 in operation 456 (i.e., $133.89 in the exemplary screen depicted in FIG. 5K); (3) the monthly cost, including taxes, associated with the aforementioned companion services, retrieved from the transaction-terms service 324 in operation 456 (i.e., $13.39 per month for the limited damage waiver, and $12.99 per month for the benefits package); (4) the total monthly lease payment, which is the sum of the values from items 1, 2 and 3 from this list; (5) the initial lease term and lease term that would be required to obtain ownership of the product if the user elects to renew for all such lease terms, retrieved from the transaction-terms service 324 in operation 456 (i.e., 12 months); and (retrieved from the transaction-terms service 324 in operation 456 (i.e., $49 in the exemplary screen depicted in FIG. 5K); and (6) the total lease cost, which is calculated by the extension 306 as the lease term from item 5 of this list multiplied by the monthly lease payment from item 2 of this list. In other words, the review-of-terms screen depicted in FIG. 5K contains the financial terms of the contemplated transaction (a lease-to-own arrangement, in the context of the present example), which were part of the response from the transaction-terms service 324 in operation 456 (or derivable therefrom).

Continuing on with the exemplary use case presently being discussed, the user reviews the terms presented via the review-of-terms screen depicted in FIG. 5K, finds them to be acceptable, and clicks the "Continue" button 530 (operation 460). The extension 306 responds to the user having clicked the "Continue" button 530 by accessing an API exposed by a payment processor 312 (depicted in FIG. 3). For example, the extension 306 may post to the aforementioned API the information required for the payment processor 312 to construct a payment screen such as the one depicted in FIG. 5L (example: the extension 306 posts the application fee or initial lease payment, i.e., $49 in the context of this example, to the API). The payment processor 312 responds by constructing the payment page of FIG. 5L, set up to receive payment information required to pay the application fee or initial lease payment, and returns to the extension a URL referencing the just-constructed screen (operation 462). (According to some embodiments, the extension presents the "Just a Moment" screen of FIG. 5H during the execution of operation 462.) The extension 306 responds to receipt of the URL from the payment processor 312 by presenting an iFrame referencing the just-returned URL (operation 464). In other words, the payment screen constructed by the payment processor 312 and depicted in FIG. 5L is presented to the user by the extension 306 in an iFrame, using the URL to access the payment screen.

Figure 5L:
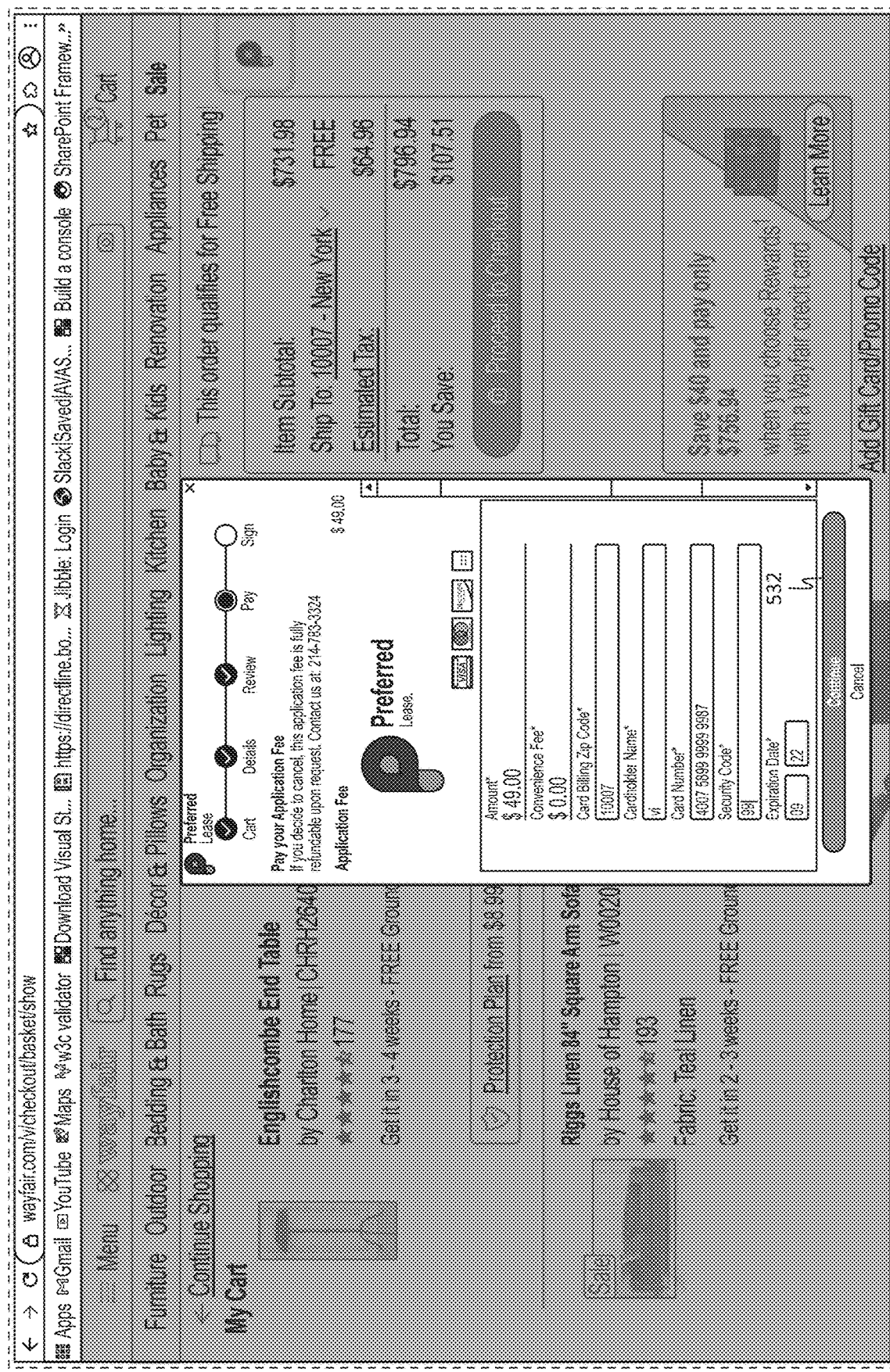

Continuing on with the exemplary use case presently being discussed, the user enters his or her payment information into the iFrame depicted in FIG. 5L (operation 466), and clicks the "Continue" button 532 (operation 468). The iFrame is constructed so as to respond to the user having clicked the "Continue" button 532 by posting the information entered therein to the payment processor 312, so that the processor 312 can, in turn, route the payment to the correct payment network in accordance with that network's rules, thereby initiating the payment for the application fee or initial lease payment. In the wake of having routed the payment, the payment processor 312 accesses a payment-processor-interface 332 (see FIG. 3) executing on the backend computing platform 308 to indicate that the payment was successfully posted to the appropriate network (operation 470). In response, the payment-processor-interface 332 stores this information in a manner accessible to the get-customer-progress service 322, which is also executing on the backend computing platform 308. As discussed below, the purpose of the get-customer-progress service 322 is to make available information to the extension 306 concerning aspects of the user's progress through the transaction-creation process (in this example, the process by which a lease-to-own arrangement is created) that would be otherwise inaccessible to the extension 306 by virtue some aspect of the process being performed by a third-party service (example: the payment processing operations are performed by the payment processor 312, meaning the extension 306 would typically have no access to information concerning whether the user's intended payment had, in fact, been posted).

Figure 4C:
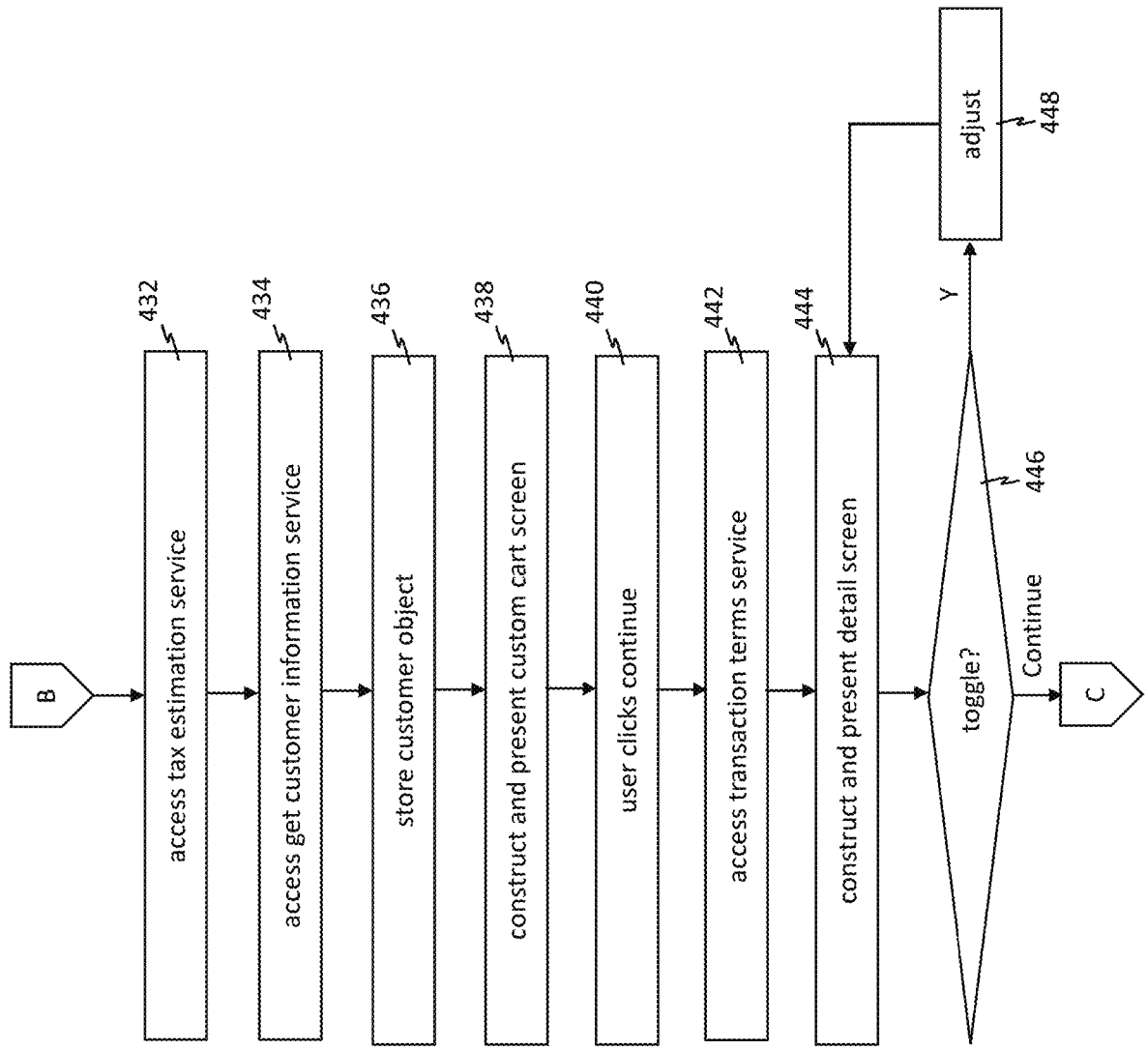
Figure 4D:
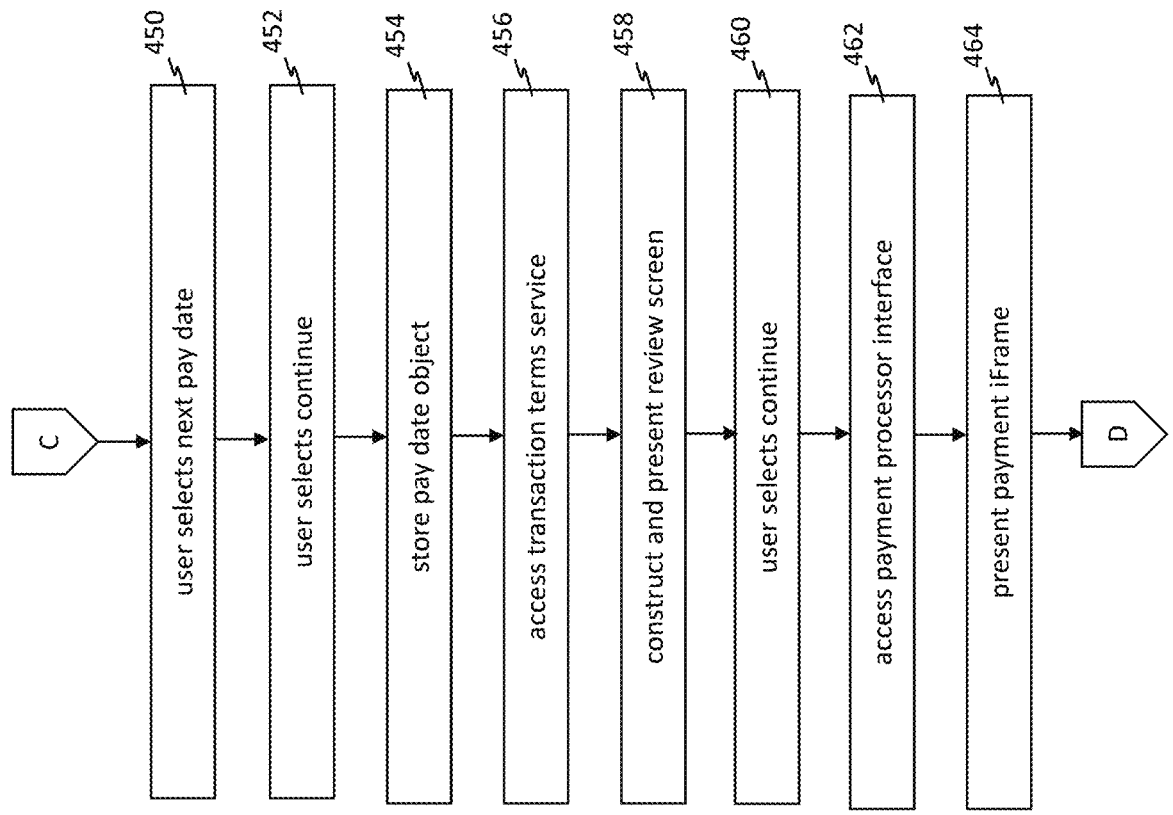
Figure 4E:
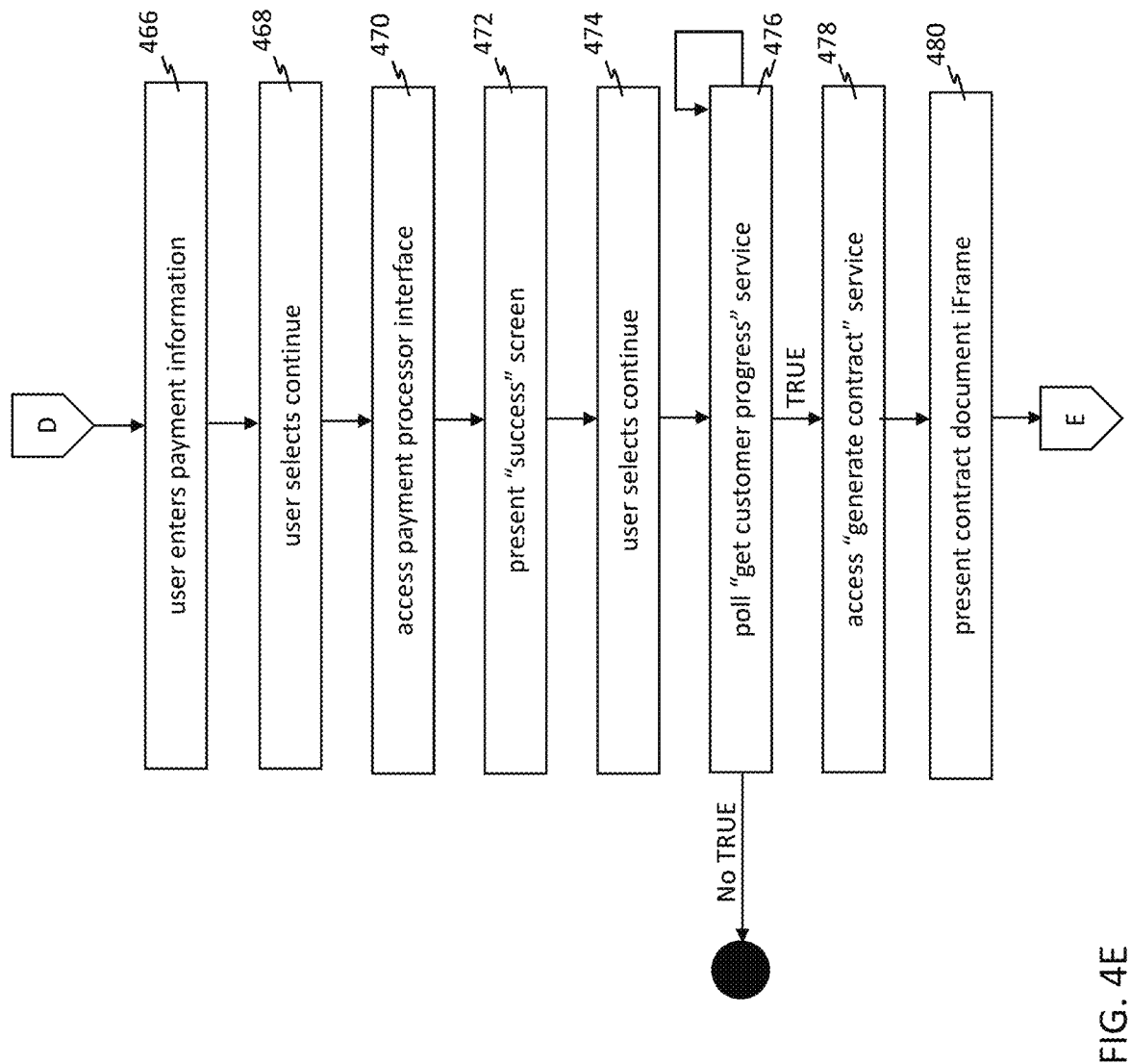
Figure 4F:
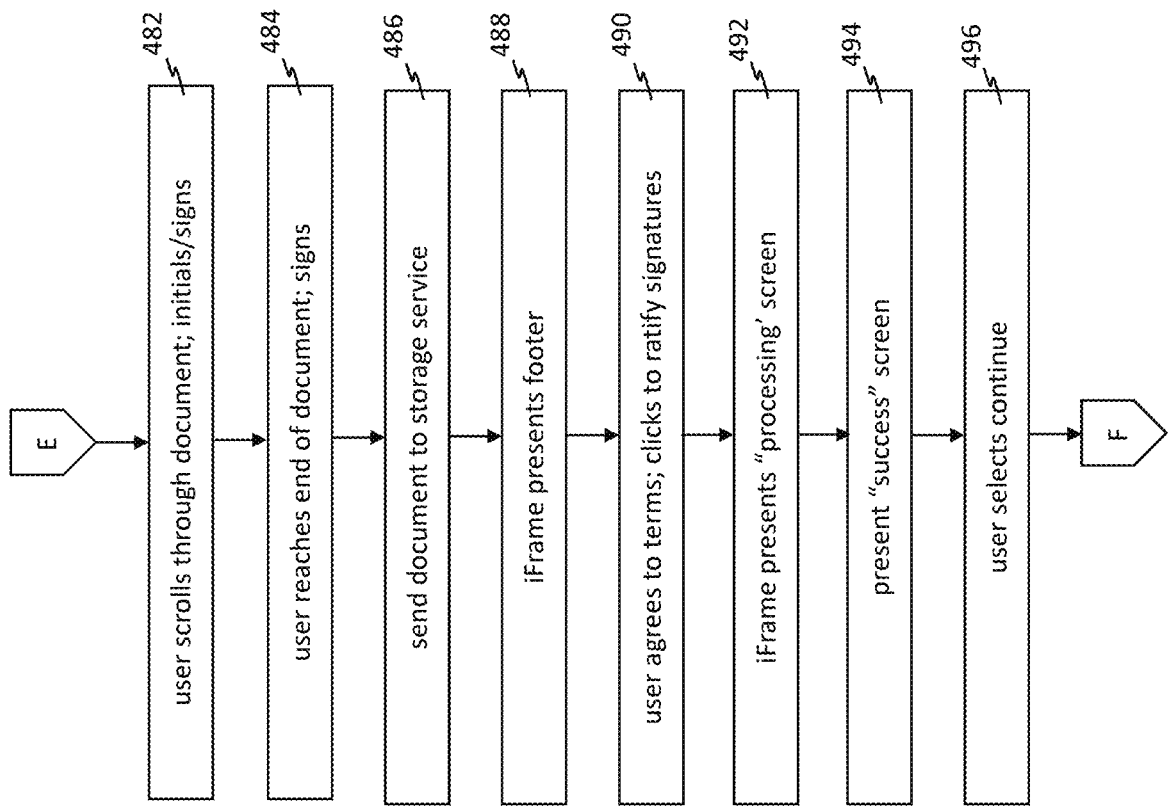
Figure 4G:
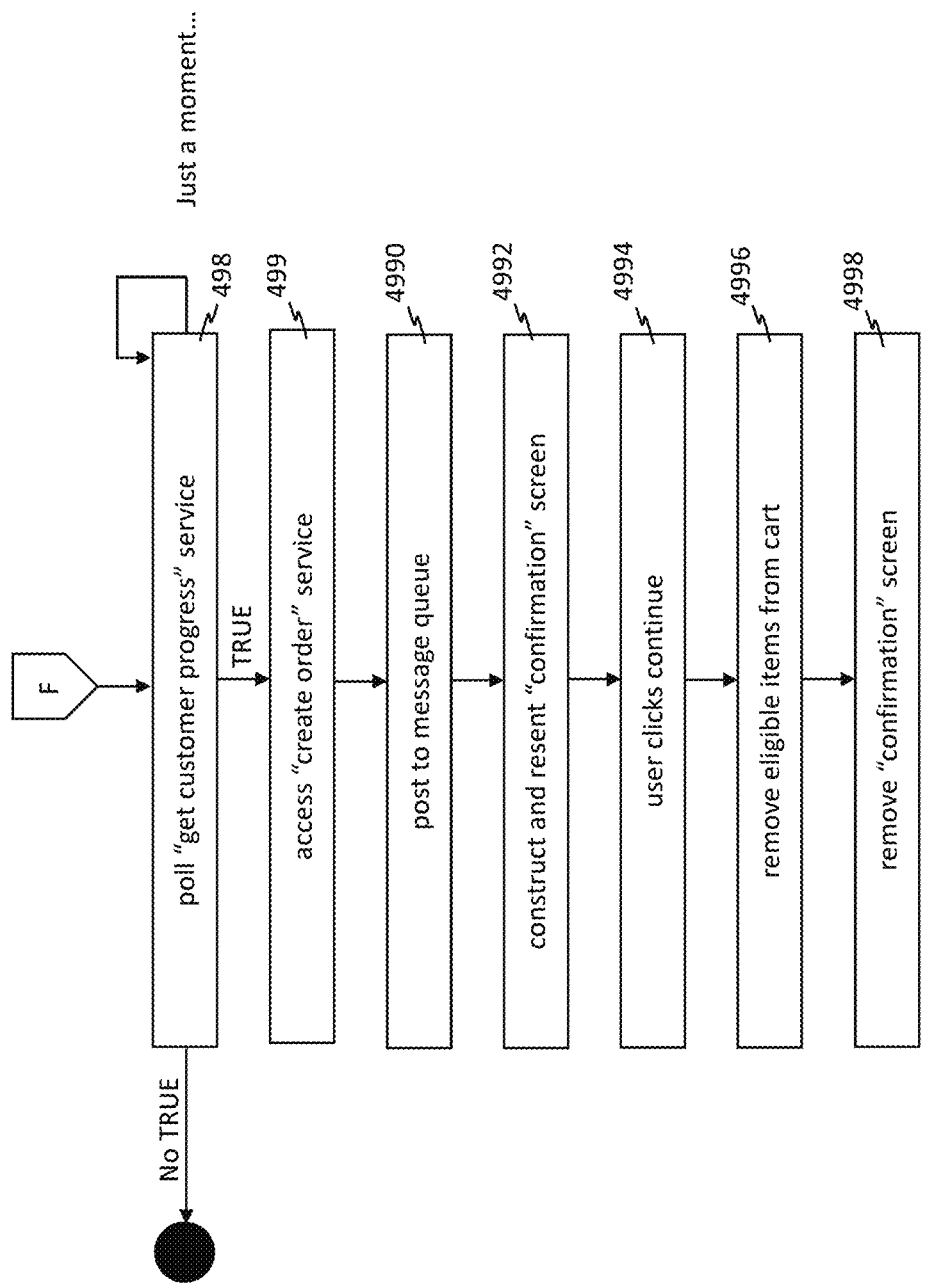
Figure 5M:
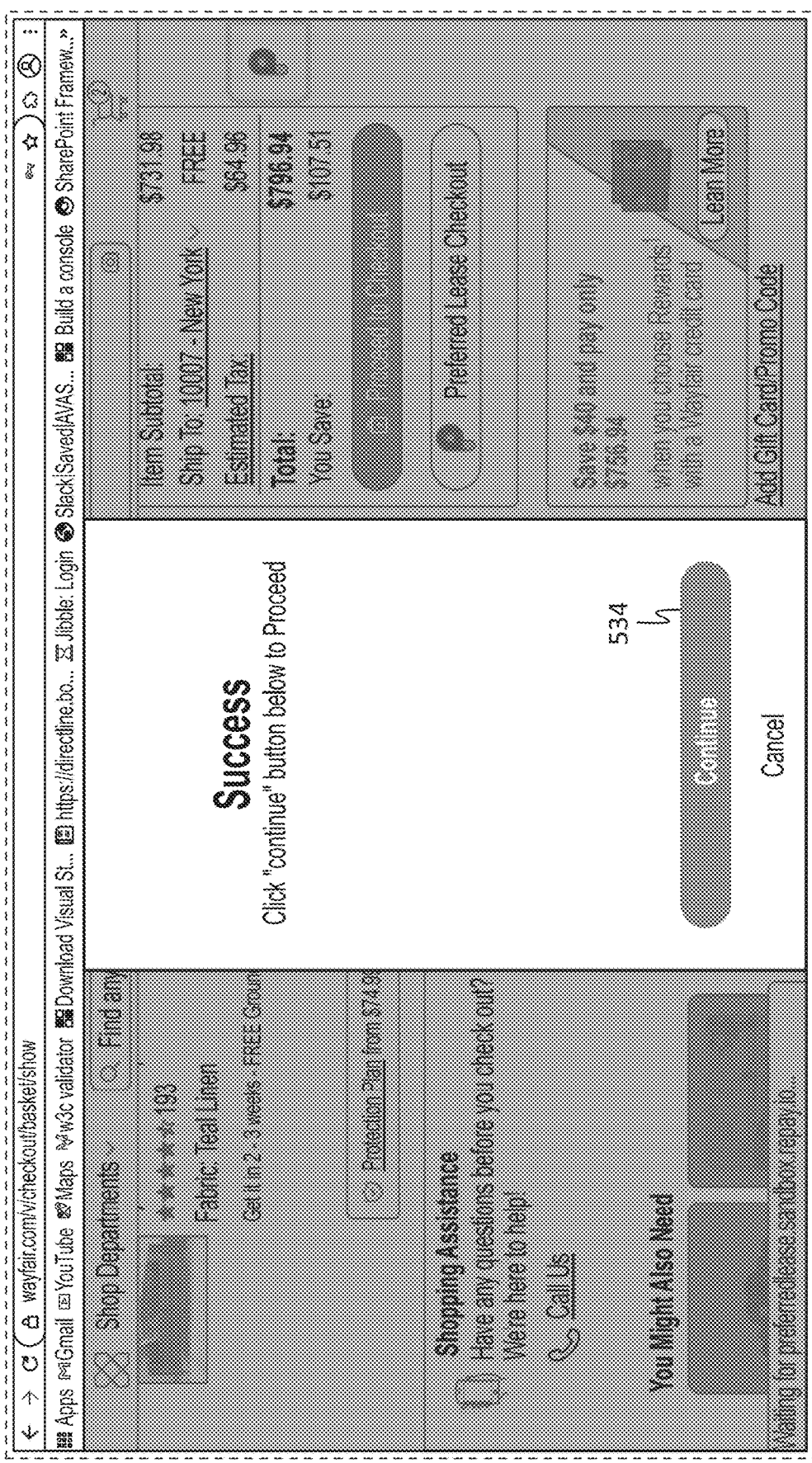
Figure 5N:
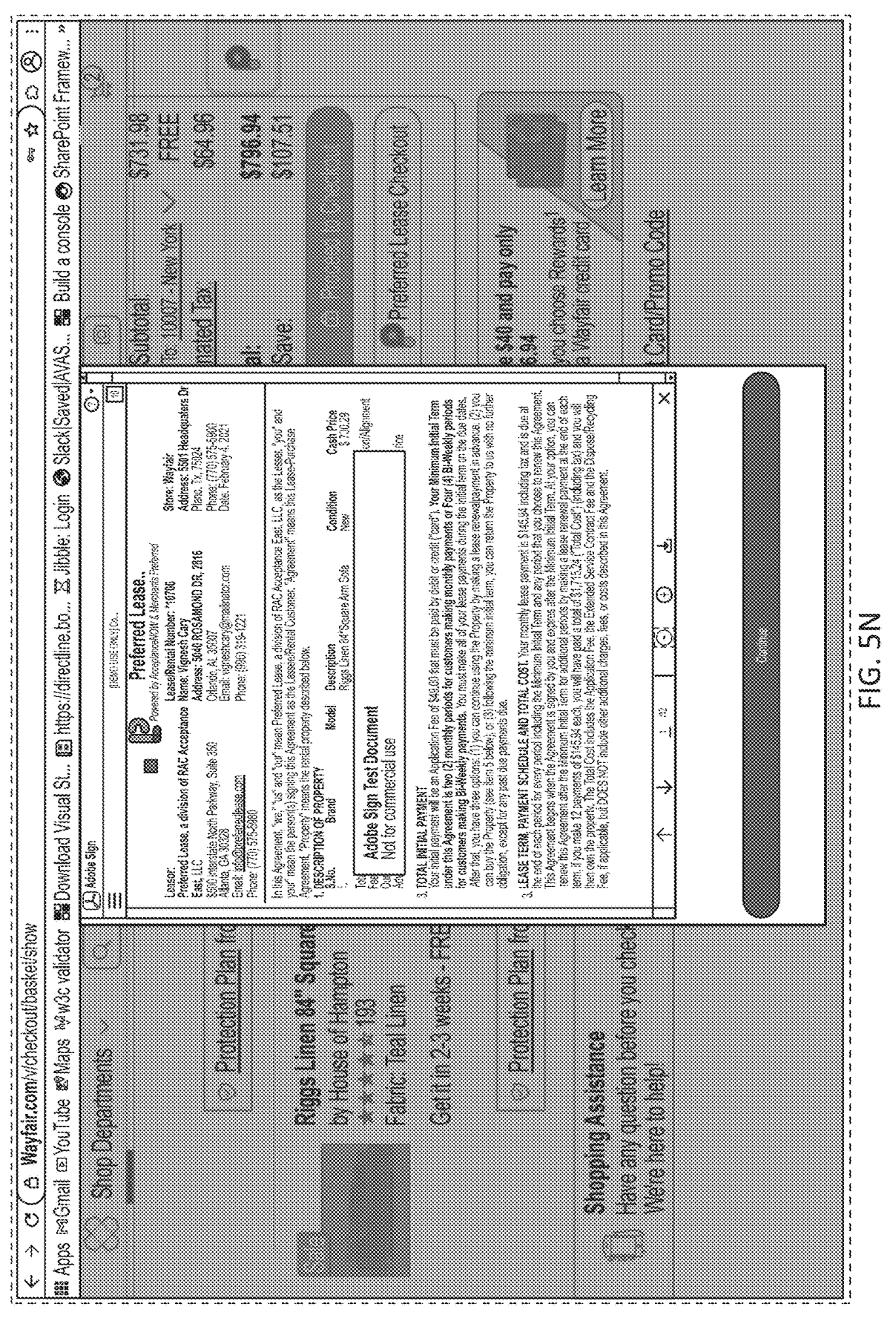
Figure 50:
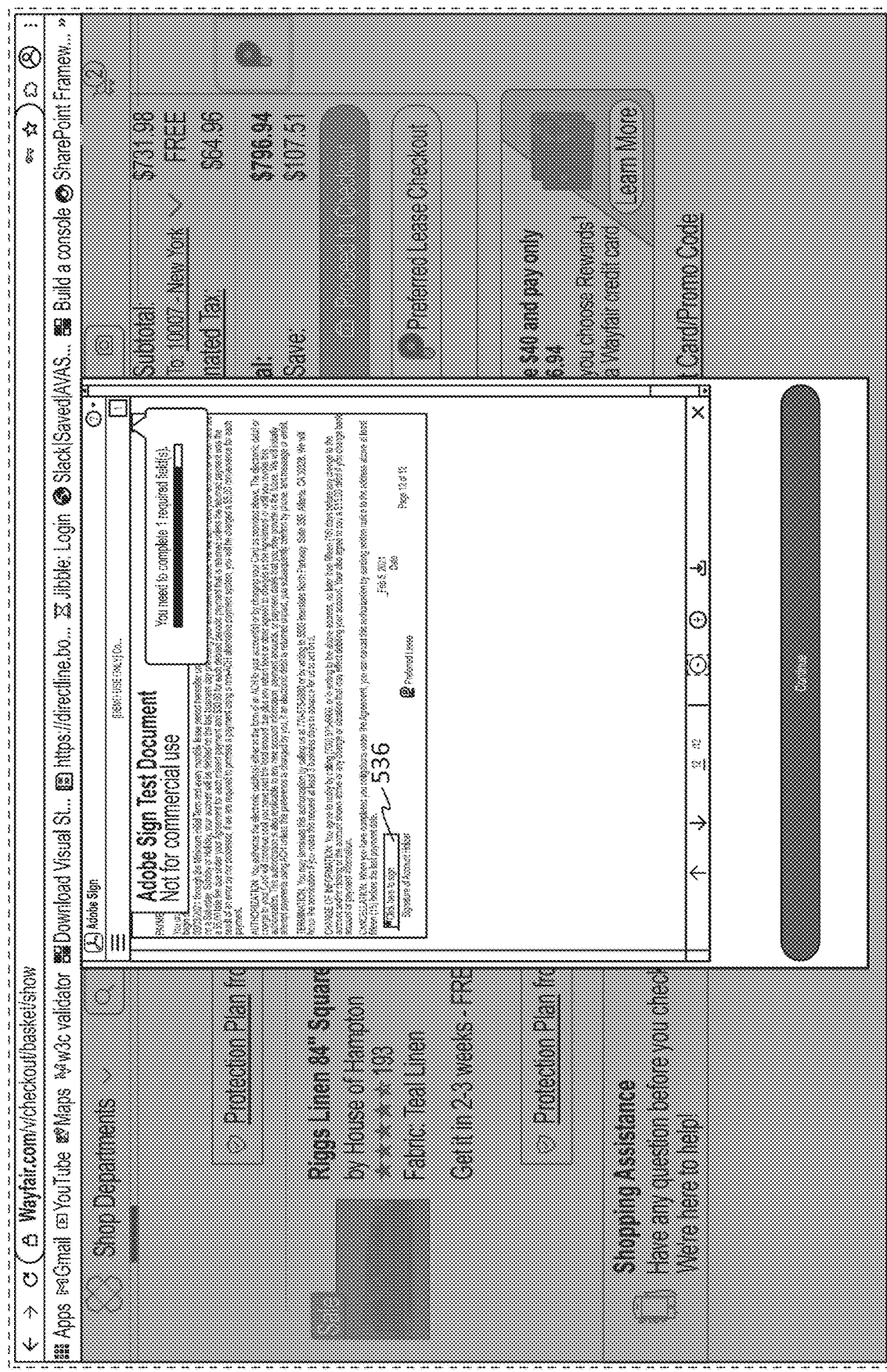
Figure 5P:
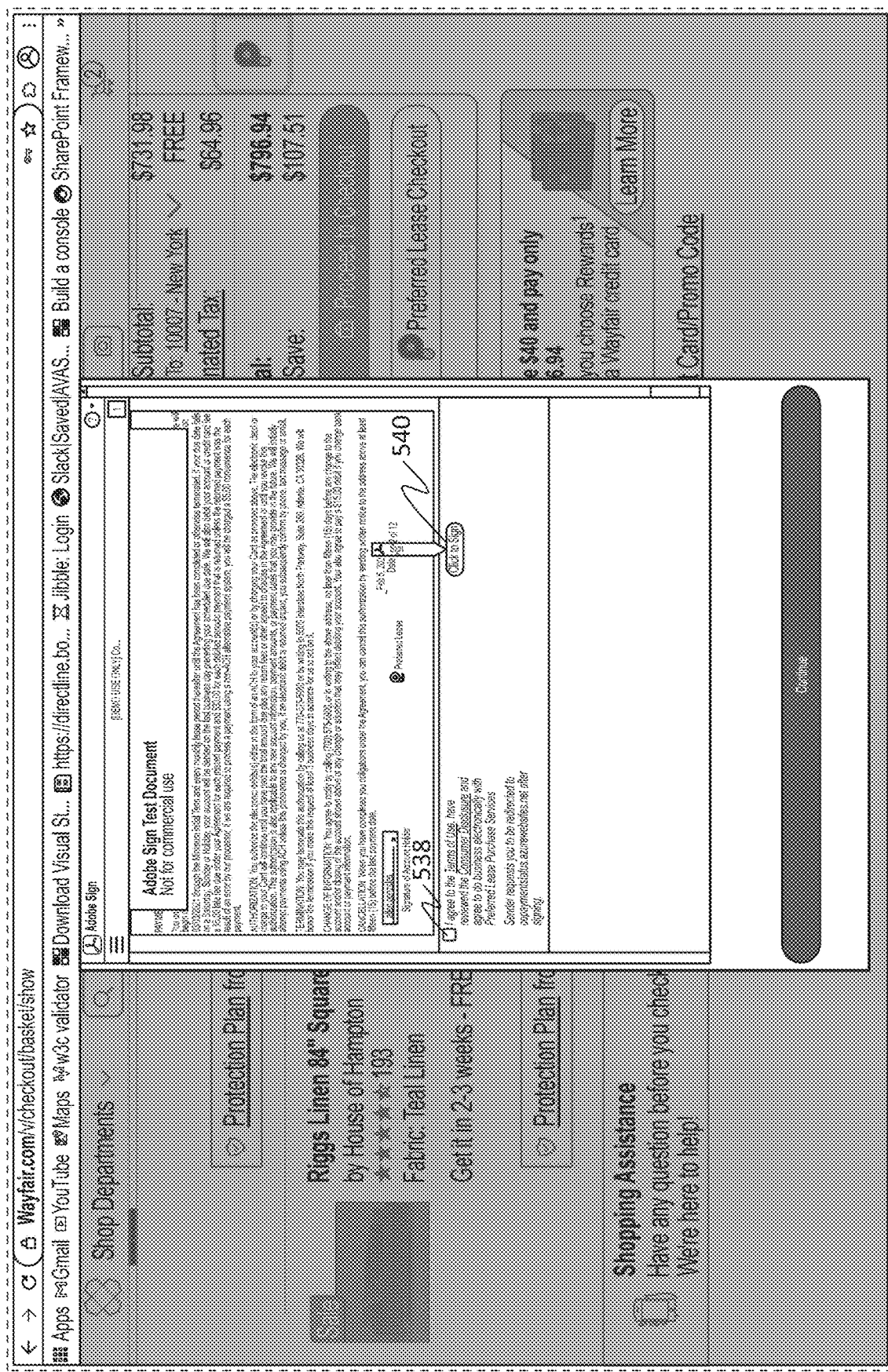

In the wake of operation 470, the extension presents a "Success" screen, such as the one depicted in FIG. 5M (operation 472), and the user responds by clicking the "Continue" button 534 (operation 474). In response to the user having clicked the "Continue" button 534, the extension 306 polls the aforementioned get-customer-progress service 322 using the aforementioned GUID associated with the user to enquire about the progress of the particular user identified by the GUID as it pertains to the payment to be made via the payment screen of FIG. 5L, and awaits an indication from the service 322 that the customer's intended payment was, in fact, posted (operation 476). In response, the service 322 accesses a storage location, such as a database record or a particular file or directory, for example, where such information concerning the successful processing of the payment is to be stored by the aforementioned payment-processor-interface 332. If the storage location contains information indicating that the payment was posted, then the get-customer-progress service 322 responds to the extension 306 with a reply message indicating that the user's payment has been posted. Otherwise, it replies with a message indicating that the user's payment has not yet been posted. If the reply message indicates that the payment has not been posted, and if a threshold number of poll attempts have been made, the extension 306 does not permit advancement through the process, and, according to some embodiments, returns operational flow to operation 462 to re-initiate presentation of a payment screen (such as one depicted in FIG. 5L). According to other embodiments, the process of FIGS. 4A-4G is exited altogether. On the other hand, if the response from the get-customer-progress service 322 indicates that the payment was, in fact, posted, then operational flow advances operation 478.

In operation 478, the extension 306 calls a generate-contract service 326 executing on the backend platform 308. The extension 306 sends the generate-contract service 326 information required to generate a contract between the user and the provider of the sought-after transaction (in this example, a lease-to-own company). According to some embodiments, this means that the extension 306 communicates the following informational elements to the service 326: (1) the lease ID returned during execution of operation 434 (FIG. 4C); (2) the product object array, as adjusted during operation 422 (FIG. 4B); and (3) the pay date object stored during execution of operation 454 (FIG. 4D). In response, the generate-contract service 326 uses the lease ID to access the user's information (recall: the lease ID was created during the initial call to the get-customer-information service 320, in the course of operation 434, and is associated with the customer's information on the backend platform 308), generates the contract, filling in such information as the user's name and address, the particular products that are the subject of the lease, the payment terms (which may be looked up using the lease ID), the contractually-obligated due dates of the payments, and so on. According to some embodiments, the document is created as a portable document format (PDF) document, which is then uploaded by the backend platform 308 to a document storage cloud service 310, which stores the document, and returns a URL to the backend platform 308. (According to some embodiments, the extension 306 presents the "Just a Moment" screen of FIG. 5H during the execution of operations 476 and 478.)

Next, in operation 480, the extension 306 opens an iFrame referencing the aforementioned URL, and the contract created during operation 478 and hosted by the document storage cloud service 310 is presented to the user in the iFrame, as depicted in FIG. 5N. The document is signable (may be interacted with by the user to introduce his or her signature or initials), and according to some embodiments, is formatted as a signable PDF document. The user scrolls through the contract and initials and signs it in the appropriate locations (operation 482). Upon reaching the end of the contract, the user clicks to sign the final signature block 536 (operation 484) (see FIG. 5O), and the iFrame responds by presenting a footer asking the user to check a checkbox 538 and click a "Click to Sign" button 540 to agree to the terms of service of the transaction provider (in this example, a lease-to-own company), and to ratify the various initials and signatures introduced by the user during the course of operations 482 and 484 (operation 486). The user checks the checkbox 538 and clicks the "Click to Sign" button 540 (operation 488).

Figure 5Q:
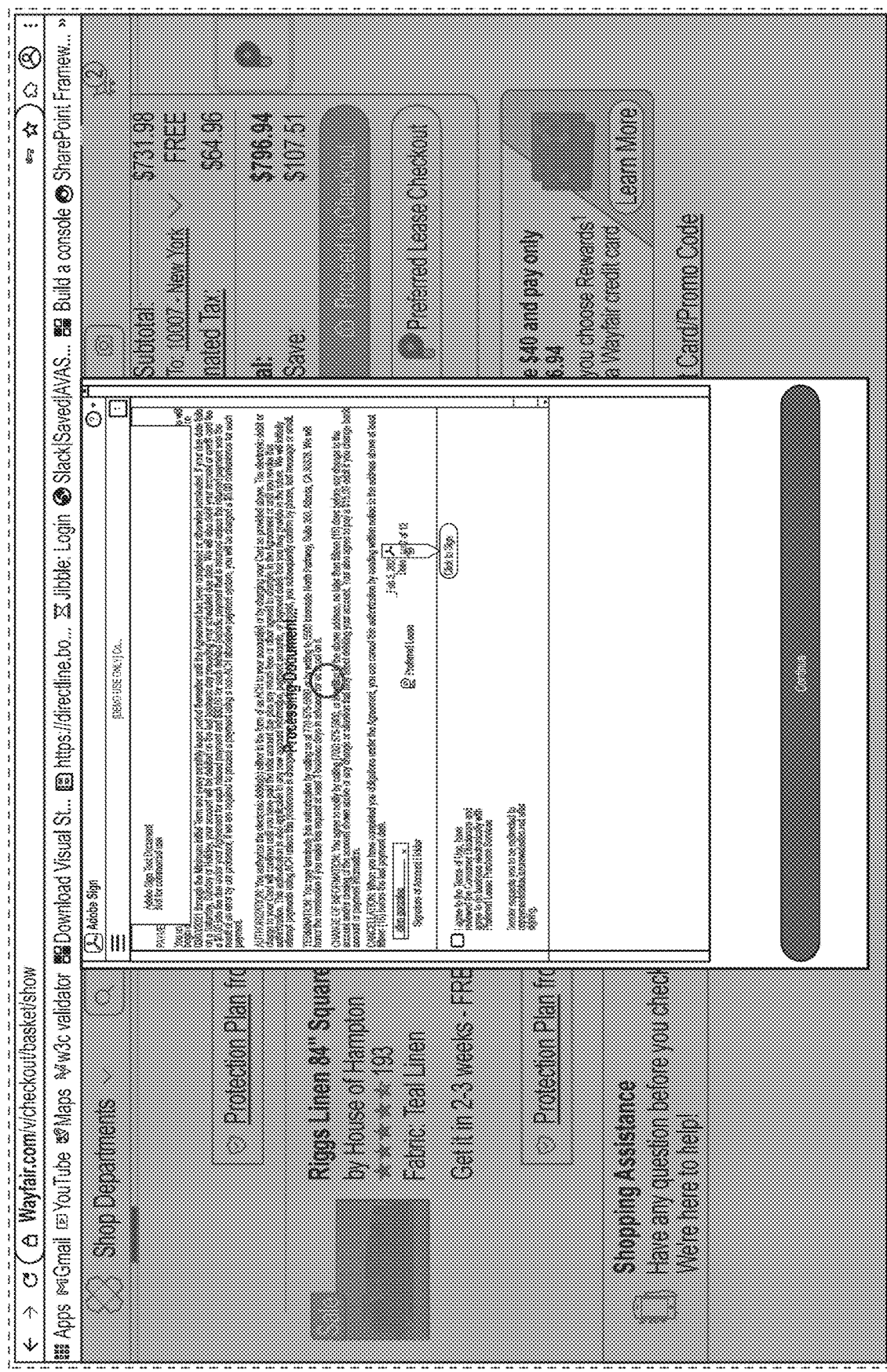

In the wake of operation 488, the iFrame communicates the document—now initialed and signed—to the document storage cloud service 310, to be stored (operation 490). Receipt of the document by the document storage cloud service 310 causes the service 310 to access a document-cloud-service interface 334 executing on the backend platform 308 to deliver a message indicating that the contract has been signed by the user. In response, the document-cloud-service interface 334 stores this information in a manner accessible to the get-customer-progress service 322, which is also executing on the backend computing platform 308. While operation 490 is occurring, the "Processing" screen depicted in FIG. 5Q may be presented (operation 492).

Figure 5R:
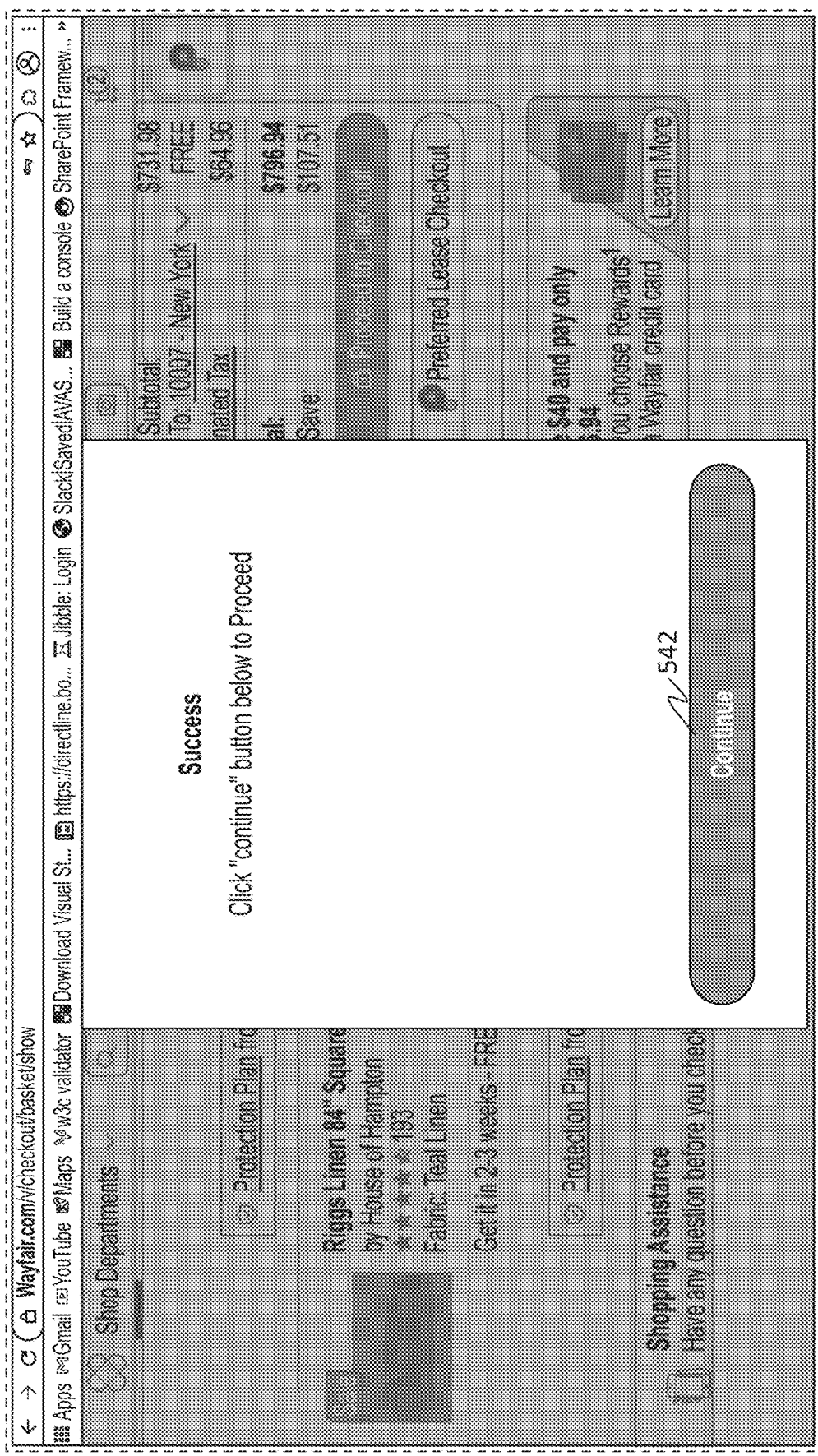

In the wake of operation 492, the extension presents a "Success" screen, such as the one depicted in FIG. 5R (operation 494), and the user responds by clicking the "Continue" button 542 (operation 496). In response to the user having clicked the "Continue" button 542, the extension 306 polls the aforementioned get-customer-progress service 322 using the aforementioned GUID associated with the user to enquire about the progress of the particular user identified by the GUID as it pertains to execution of the contract, and awaits an indication from the service 322 that the customer, in fact, executed the contract (operation 498). In response, the service 322 accesses a storage location, such as a database record or a particular file or directory, for example, where such information concerning the successful execution of the contract is to be stored by the aforementioned document-cloud-service interface 334. If the storage location contains information indicating that the contract was executed, then the get-customer-progress service 322 responds to the extension 306 with a reply message so. Otherwise, it replies with a message indicating that the contract has not yet been fully executed. If the reply message indicates that the contract has not yet been fully executed, and if a threshold number of poll attempts have been made, the extension 306 does not permit advancement through the process, and, according to some embodiments, returns operational flow to operation 480 to re-initiate presentation of the contract. According to other embodiments, the process of FIGS. 4A-4G is exited altogether. On the other hand, if the response from the document-cloud-service interface 334 indicates that the contract was, in fact, executed, then operational flow advances operation 499.

At this stage of the process, the user has indicated which products he or she desires to lease, the products have been validated to determine which of them are eligible to be leased, and a contract has been signed between the user and the lease-to-own company establishing a lease-to-own arrangement between the user and the lease-to-own company relating to the eligible products. Next, the eligible products must be purchased by the lease to own company and delivered to the user. According to some embodiments, purchase of the products is conducted via a robotic process automation (RPA) system that operates upon the e-commerce website 302. In operation 499, the extension 306 initiates creation of a record within a database of an order to be effectuated by the aforementioned RPA. Specifically, in operation 499, the extension 306 accesses a create-order service executing on the backend platform 308 the information required to create the order record. According to some embodiments, the dataset includes: (1) the customer object stored by the extension in operation 436 (FIG. 4C); (2) the product object array, as adjusted during operation 422 (FIG. 4B); (3) lease ID returned in operation 434; (4) the total order cost calculated in connection with the construction of the screen of FIG. 5K; (5) estimated agreement taxes (i.e., the sum of all taxes associated with eligible products and selected companion services), calculatable from the information returned by the transaction-terms service 324 in operation 456; (6) the date of the creation of the agreement, i.e., the current date; and (7) the agreement's total cost, as determined during the construction of the screen of FIG. 5K.

Figure 7A:
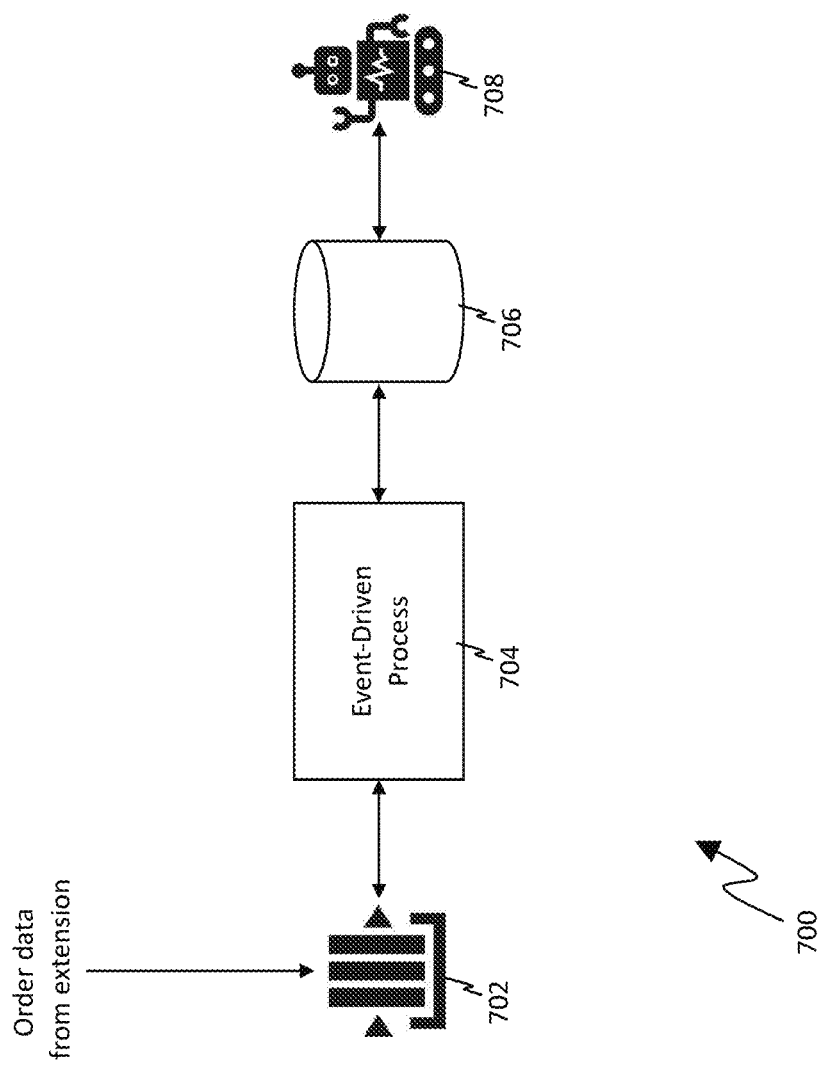
FIG. 7A depicts an exemplary system for carrying out a robotic process automation function to conduct purchases of goods or services, in accordance with certain embodiments.

Next, in operation 4990, the extension 306 posts a message to a messaging queue 702 of an RPA system executing on the backend computing platform (depicted in FIG. 7A). (The messaging queue 702 and FIG. 7A are discussed in more detail herein, below.) The message contains the information necessary for the RPA system to navigate the e-commerce website to conduct a purchase of the eligible products and to navigate the checkout process so as to pay for those products and have them delivered to the user's residence. According to some embodiments, the dataset communicated to the queue by the extension 306 includes the retailer ID, a lease ID, and the product object array. By virtue of having posted the aforementioned message to the messaging queue, the extension 306 has initiated the aforementioned RPA process. (According to some embodiments, the "Just a Moment" screen of FIG. 5H is presented by the extension during the execution of operation 4990.)

Figure 5S:
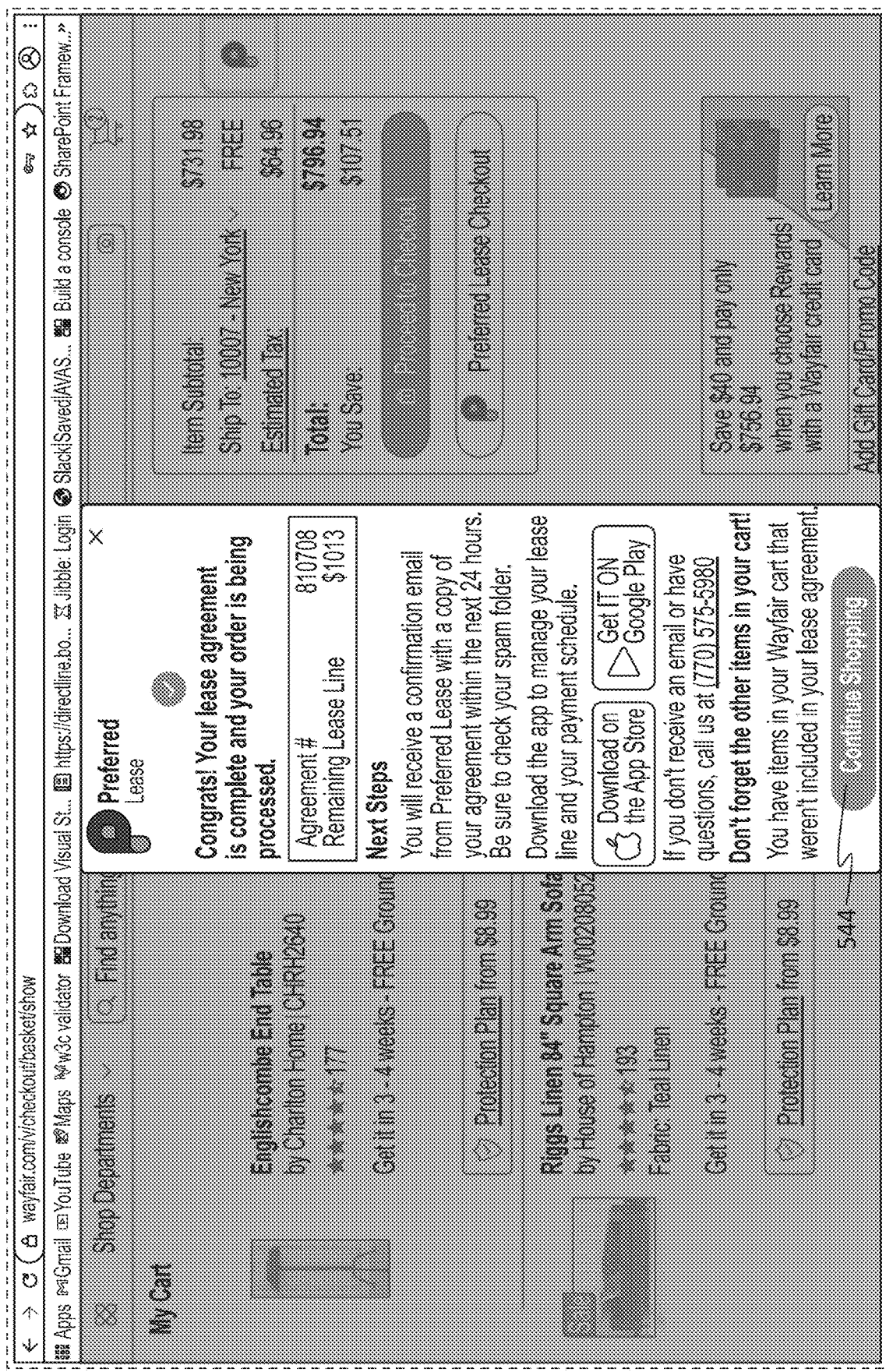

In the wake of operation 4990, operational control is passed to operation 4992, in which the extension 306 constructs and presents the confirmation screen, as depicted in FIG. 5S. The confirmation screen includes a statement confirming to the user that his or her order is being processed (i.e., the aforementioned RPA process has been initiated and is underway), and also presents the lease ID (example: 810708) and a reiteration of the user's remaining open-to-lease line, which was presented previously to the user on the screen depicted in FIG. 5I. The screen contains a "Continue Shopping" button 544. The user clicks the button 544 (operation 4994), and the extension 306 responds by removing the eligible items from the digital shopping cart. Thus, the digital shopping cart native to the e-commerce website 302 now contains only those items that could not be acquired via the sought-after transaction (i.e., the lease-to-own arrangement, according to this example). Finally, the extension 306 closes, removing its user interface from the web browser 304 (operation 4998), thus revealing the shopping cart, and thereby giving the user the opportunity to purchase the remaining items in the shopping cart via the native checkout process.

Figure 6:
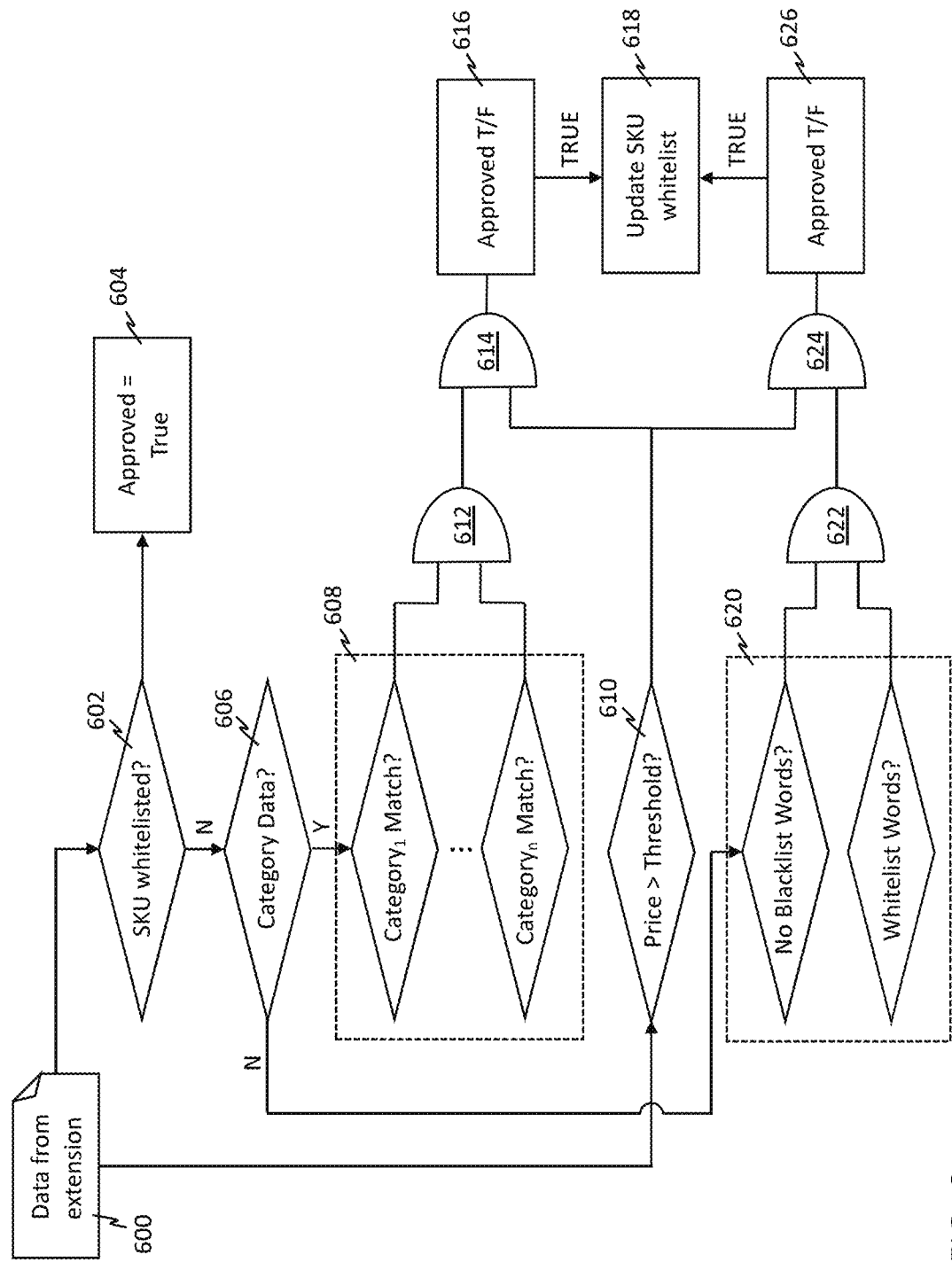
FIG. 6 depicts an exemplary method for providing validation services in connection with the system of FIG. 3, in accordance with certain embodiments.

Discussion now turns to operation of the validation service 316 (depicted in FIG. 3), which was previously referenced in connection with operation 430 (depicted in FIG. 4B). FIG. 6 depicts the validation service 316, according to certain embodiments. As discussed in connection with FIG. 4B, the extension (such as extension 306) sends a set of data 600 to a validation service to identify the eligible items from amongst those in the shopping cart of the e-commerce website. The data set 600 may include, for example, the aforementioned product object array and an indication of the particular e-commerce site with which the extension is interoperating (example: a retailer ID or domain of the e-commerce site).

In operation 602, the validation service of FIG. 6 responds by using the indication of the of the particular e-commerce site with which the extension is interoperating to access a whitelist customized for that particular e-retailer. The whitelist is a set of SKUs corresponding to eligible products from amongst the aforementioned e-retailer's product offering. Thus, the validation service uses the indication of the of the particular e-commerce site with which the extension is interoperating to access the particular whitelist corresponding to that particular e-retailer, and determines whether or not the SKU is on the whitelist. If it is, then the product is declared eligible (operation 604).

On the other hand, if the SKU is not on the aforementioned whitelist, it may be the case that the whitelist is not exhaustive, for one reason or another (example: perhaps the e-retailer recently altered its product offering to include new products, which have not been evaluated for inclusion on the whitelist). To address the issue of potential incompleteness of the whitelist, control is passed to operation 606, wherein the dataset 600 is examined to determine whether it includes category data. If so, operational flow is passed to operation 608. In operation 608, the category information pertaining to a particular product is compared to a whitelist of categories uniquely created for each particular e-commerce website with which the extension may interoperated with. Thus, assuming, for example, that the dataset 600 revealed that the e-retailer was Best Buy, and assuming that the category information was category$_1$="Audio", category$_2$="Home Audio", category$_3$="Speakers", then in operation 608, the whitelist pertaining to Best Buy is examined to see whether products categorized under the trio of "Audio", "Home Audio", "Speakers" are eligible (i.e., is there a record in the category whitelist corresponding to Best Buy containing "Audio" in a categoryi field, "Home Audio" in a category$_2$ field, and "Speakers" in a cagegory$_3$ field?). If so, then the dataset is examined to determine the price of the product, and it is compared to a threshold (example: $300) (operation 610). If both (1) the product categories are whitelisted, and (2) the price of the product exceeds the aforementioned threshold (see "AND" gates 612 and 614), then the product is approved as eligible (operation 616). Thereafter, if a particular product was declared eligible on the basis of its category information, the aforementioned SKU whitelist for the relevant e-retailer is updated to include the SKU contained in the dataset 600 (operation 618). If, on the other hand, either test fails, then the product is declared ineligible.

In the event that the dataset 606 does not include category data, then the product name or description is examined instead of category data (operation 620). In operation 620, the product name or description is compared against a blacklist of keywords or phrases uniquely created for each e-commerce website with which the extension may interoperate (i.e., one blacklist for each such site), and it is required that the product name or description contain no such blacklisted keyword or phrase. Additionally, the product name or description is compared against a whitelist of keywords or phrases uniquely created for each e-commerce website with which the extension may interoperate (i.e., one keyword whitelist for each such e-commerce website), and it is required that the product name or description contain at least one whitelisted keyword or phrase. If both conditions are met, and if the price of the product exceeds the aforementioned threshold (see "AND" gates 622 and 624), then the product is approved as eligible (operation 626). As was the case in the wake of operation 616, in the wake of operation 626, if a particular product was declared eligible on the basis of its keyword information, the aforementioned SKU whitelist for the relevant e-retailer is updated to include the SKU contained in the dataset 600 (operation 618).

Figure 7B:
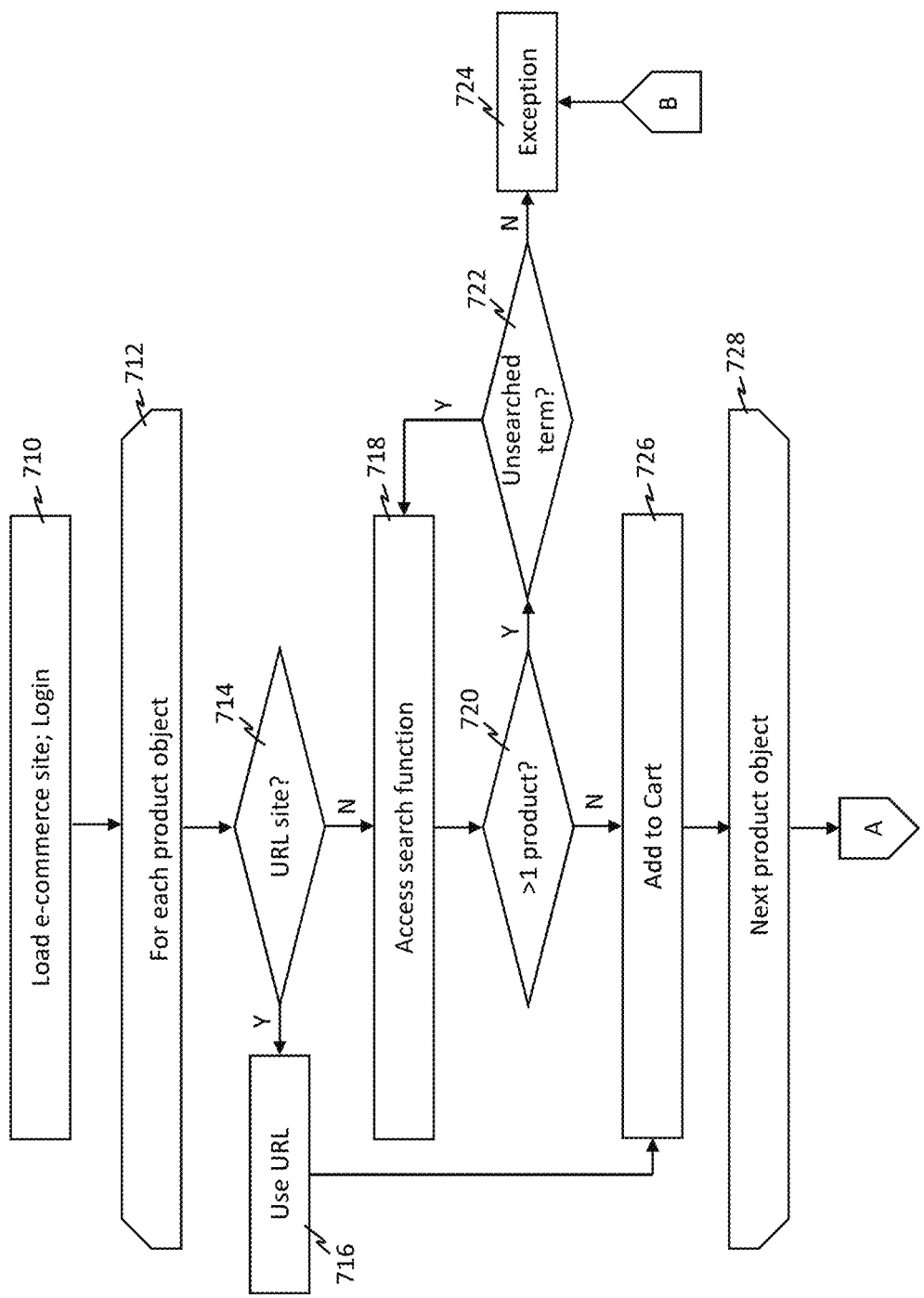
FIGS. 7B-7C depict an exemplary method for carrying out a robotic process automation function to conduct purchases of goods or services in connection with the system of FIG. 7A, according to certain embodiments.
Figure 7C:
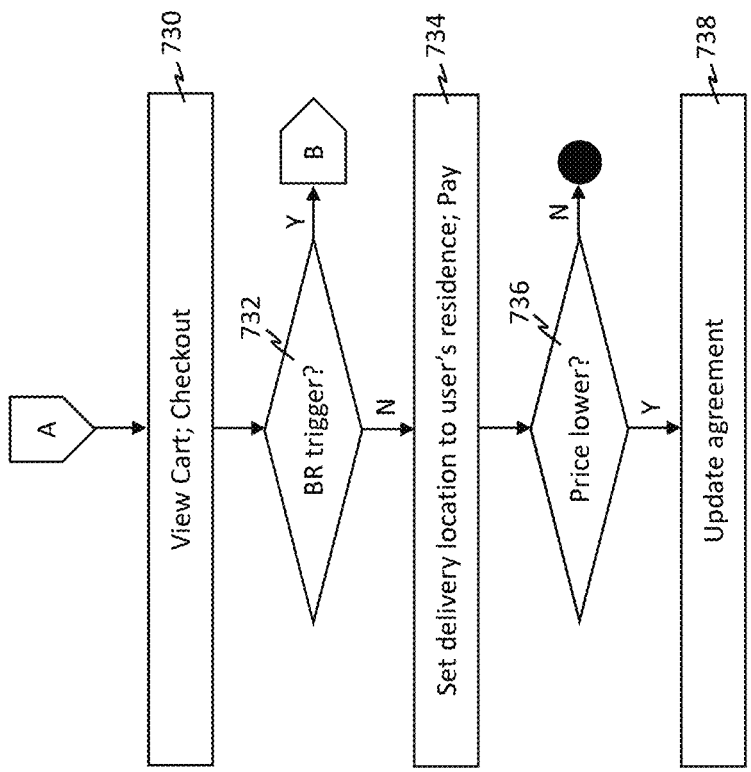

Discussion now turns to an embodiment of the aforementioned RPA process for purchasing the eligible goods from the e-commerce website in the wake of having completed the sought-after transaction. FIG. 7A depicts an embodiment of a computerized system 700 for performing such a process. The system includes a messaging queue 702 that receives the messages sent from the extension to initiate execution of the process, such as may occur during execution of operation 4490 (FIG. 4G). Introduction of a new message into the queue 702 generates an event that is responded to by an event-drive process 704, which, according to some embodiments, is dynamically allocated computing resources and executed in response to the occurrence of such an event. The process extracts the aforementioned message from the queue and enters into a database 706 as a new record. A computerized robot ("bot") 708 responds to the creation of such a new record by reading the record, and performing an RPA process to purchase the goods described by the record. According to some embodiments, the bot may be embodied as a web browser automation system, such as Selenium web browser automation tool, which performs actions within web browsers without necessitation of human effort, i.e., "robotically." Certain embodiments of the process performed by the bot are depicted in FIGS. 7B and 7C.

Initially, the bot responds to the acquisition of a new record from the database 706 by examining the record to determine from which particular e-commerce website the products within the record are to be purchased. The bot 708 launches a (headless, according to some embodiments) instance of a web browser, navigates to the particular e-commerce site from which the products that are the subject of the record are to be bought, and logs into a user account pre-established in the name of the transaction company (lease-to-own company, in the context of the present example) on the aforementioned e-commerce site (operation 710).

In the wake of operation 710, the bot performs a loop defined by loop limit indicators 712 and 728 for each of the products referenced in the record. In operation 714, the bot 708 determines whether the product to be purchased should be accessed by use of a URL directly referencing a given product's product detail page, or whether a search function native to the e-commerce site should be used. In the event that a URL is to be used to access the product detail page corresponding to the particular product referenced by the loop limit indicator 712, the bot 708 navigates to the product detail page by entering the aforementioned URL into the URL bar of the web browser (operation 716), and then adds the product to the cart by clicking an "Add to Cart" button located on the product detail page (operation 726). Thereafter, the next product referenced in the record is operated upon (see loop limit indicator 728), if such next product exists. On the other hand, if in the course of operation 714 it is determined that the search function native to the e-commerce website should be used to navigate to the product description page, the operational flow is passed to operation 718.

In operation 718, the aforementioned search function is employed using a unit of data extracted from the aforementioned record. For example, the bot 708 may enter the SKU of the product to be purchased into the search function of the e-commerce website. Alternatively, the bot 708 may enter the product name into the search function, and any other unit of data within the record that will cause the search function to uniquely present the product description page corresponding to the product. After having used the employed function in operation 718, the bot 708 examines the page returned by the function to determine whether it presents more than a single product (for example, a product description page may, in some instances, present multiple products, such as different colors of the same sofa—all of which are associated with the same product name, SKU, and so on) (operation 720). If the product description page presents more than one product, the bot 708 is presented with an ambiguous scenario, and control is therefor passed to operation 722, wherein the bot 708 examines the aforementioned record to determine if there is another unit of data in the record as yet unused as a search term in operation 718 (operation 722). If so, the search process of operation 718 is repeated. If not, then the bot 708 declares an exception (operation 724), which is recorded in the aforementioned database 706, in order to indicate: (1) that the order was not placed robotically; and (2) the particular reason that the bot 708 did not place the order. According to some embodiments, personnel of the transaction company (in the context of this example, a lease-to-own company) then handle the process of acquiring the product from the website manually. Returning to the topic of operation 720, if in the course of that operation it is determined that the product description page contains only a single product, then there scenario does not present the bot 708 with ambiguity, and the bot 708 adds the product to the cart (operation 726) and proceeds on to the next product (see loop limit indicator 728). Assuming that there exists no next product, then operational flow is passed to operation 730 (see FIG. 7C).

In operation 730, the bot 708 enters the cart and initiates the checkout process. In response, the e-commerce website presents a summary screen that details the particular items in the cart and the total cost of the check process, including tax (i.e., the aggregate cost of each product, including tax), so that the user—in this case, the bot 708—can review the information to ensure it is correct. The bot 708 examines the information on the screen to ensure that it does not violate any business rules (operation 732). For example, if the total cost, including tax, is greater than that which was presented to the user during the transaction process (such as via the "Total Cost of Items" element on screen depicted in FIG. 5I), or greater than such amount by a threshold quantity, then control is passed to operation 724, and an exception is declared, with the same consequences as described previously (recall: the "Total Cost of Items" value was based, in part, on an estimated tax value delivered by a tax estimation service 318, and may be different than the actual tax value calculated by the e-commerce website). On the other hand, if no business rule is violated, then control is passed to operation 734, and the bot completes the checkout process by setting the delivery location equal to the user's residence, and paying for the item. According to some embodiments, the item is paid for with a purchasing card (P-card) titled in the name of the transaction company. According to some embodiments, the delivery location may be set equal to another location, such as another address determined by the user. Finally, in operation 736, it is determined whether the total cost, including tax, is less than that which was presented to the user during the transaction process. If this is the case, then the user would have been over-charged for the transaction (such as the exemplary lease-to-own transaction), and the contract establishing the transaction is updated to reflect the proper price, thereby rectifying any such over-charge situation (operation 738).

FIGS. 8A and 8B depict certain exemplary embodiments of a communication relay process 336 executing on the backend platform 308. The purpose of the communication relay process 336 is to receive emails that are sent by the various e-retailers for which the products were purchased on behalf of users, to restructure those emails so as to be appropriate for receipt by the users, and to send such restructured emails to the users.

According to some embodiments, a unique email address is created to correspond to each e-retailer with which the extension is designed to interoperate with. Thus, the user account created on behalf of the transaction company at e-commerce website #1 identifies email address #1 as the appropriate contact email address, while the user account created on behalf of the transaction company at e-commerce website #2 identifies email address #2 as the appropriate contact email address, and so on. Therefore, at any such given email address, all of the inbound email originates from a single particular e-retailer, and therefore conforms to a single, known, structure at any given point in time. The process of FIG. 8A operates upon each such email inbox.

The process begins by observing a given email inbox (operation 800) and determining whether a new email has been delivered thereto (operation 802). In response to a new email having been received, the particular variety of email is determined (operation 804). If the email is of certain varieties, the relevant data from the email will be parsed from it and stored in a database. For example, if the email is if a variety indicating that a given retailer has shipped the ordered product, the information pertaining to the shipment (order number, delivery address, shipping date, anticipated delivery date, tracking number, carrier, and so on) is parsed from the email and stored as a record in the data base (operation 806). As another example, if the email is if a variety indicating that a given order has been delivered, the information pertaining to the delivery (date, order number, carrier, tracking number, and so on) is parsed from the email and stored as a record in the data base (operation 808).

Another process observes the database (operation 810) and awaits the creation of a new record therein (operation 812). In response to a new record having been created, the proper recipient of the email is determined (example: by using the order number to trace the order to a given user), and the information from the record is sent as a message to an email delivery engine (operation 814). The engine uses the information to populate a normalized email body corresponding to each type of email intended to be forwarded to users (example: shipping emails and delivery emails). According to some embodiments, the aforementioned order number assigned to a given order by an e-retailer is not included in the information set used to populate such email bodies, so that the users receiving such emails possess neither a receipt, nor sufficient information to complete a return process with an e-retailer. Such embodiments may be appropriate for lease-to-own companies, for example, wherein a return of a leased product by a user to the e-retailer (versus a return to the lease-to-own company) is antithetical to the underlying transaction. According to other embodiments, the aforementioned order number assigned to a given order by an e-retailer is, in fact, included in the information set used to populate such email bodies.

Figure 9:
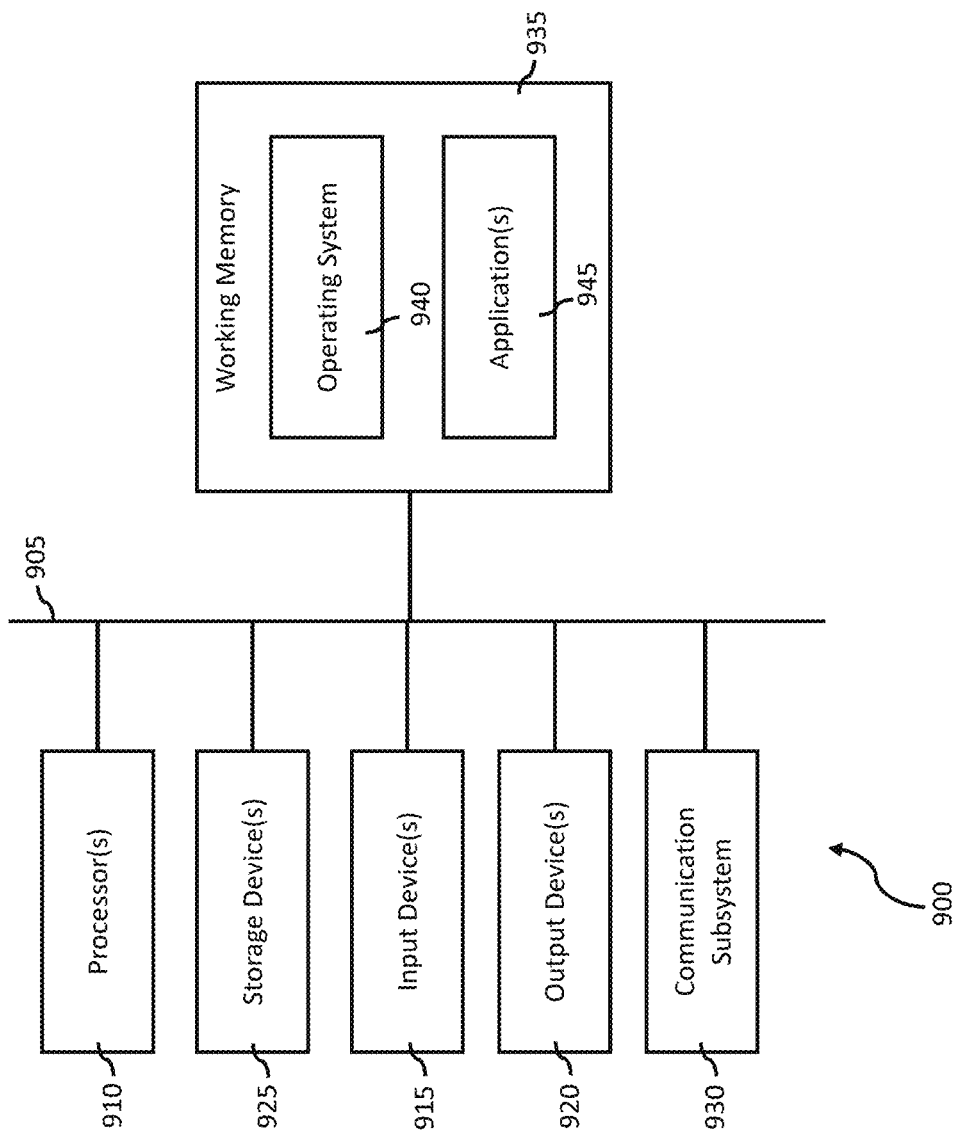
FIG. 9 depicts an exemplary computing device for use in connection with any of the embodiments disclosed herein, in accordance with certain embodiments.

To perform the actions of the computer, laptop, tablet, smartphone, or portable device on which the web browser 104 or 304 executes, host the backend platform 108 or 308, the payment processor 312, document cloud server 310 or third party services 110, or execute any of the methods or schemes herein and/or embody any of the other previously mentioned computing devices, a computer or server system as illustrated in FIG. 9 may be used. A networked system of such computers, devices or server systems may likewise be used. FIG. 9 depicts a schematic illustration of one embodiment of a computer system 900 that can perform the methods provided by various other embodiments, as described herein, and/or can function as the host computer system, a server system, a laptop, tablet, smartphone, a mobile device, and/or a computer system. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, and/or the like); one or more input devices 915, which can include without limitation a mouse, a keyboard, touchscreen and/or the like; and one or more output devices 920, which can include without limitation a display device, a printer and/or the like.

The computer system 900 may further include (and/or be in communication with) one or more storage devices 925, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 900 may also include a communications subsystem 930, which can include without limitation a modem, a network card (wireless or wired), an infrared communication device, a wireless communication device and/or chipset (such as a BLUETOOTH™ device, an 802.11 device, a WiFi device, a WiMax device, cellular communication facilities, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 925 described above. In some cases, the storage medium might be incorporated within a computer system, such as the system 900. In other embodiments, the storage medium might be separate from a computer system (e.g., a removable medium, such as a compact disc), and or provided in an installation package, such that the storage medium can be used to program, configure and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 8945) contained in the working memory 935. Such instructions may be read into the working memory 935 from another computer-readable medium, such as one or more of the storage device(s) 925. Merely by way of example, execution of the sequences of instructions contained in the working memory 935 might cause the processor or processors 910 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to the processor or processors 910 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 925. Volatile media include, without limitation, dynamic memory, such as the working memory 935. Transmission media include, without limitation, coaxial cables, copper wire and fiber optics, including the wires that comprise the bus 905, as well as the various components of the communication subsystem 930 (and/or the media by which the communications subsystem 930 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor or processors 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900. These signals, which might be in the form of electromagnetic signals, acoustic signals, optical signals and/or the like, are all examples of carrier waves on which instructions can be encoded, in accordance with various embodiments of the invention.

The communications subsystem 930 (and/or components thereof) generally will receive the signals, and the bus 905 then might carry the signals (and/or the data, instructions, etc. carried by the signals) to the working memory 935, from which the processor(s) 905 retrieves and executes the instructions. The instructions received by the working memory 935 may optionally be stored on a storage device 925 either before or after execution by the processor(s) 910.

The various embodiments described above are provided by way of illustration only and should not be construed to limit the invention. Those skilled in the art will readily recognize various modifications and changes that may be made to the present invention without departing from the true spirit and scope of the present invention, which is set forth in the following claims.

The invention claimed is:

1. A transaction system for permitting a user of said transaction system to acquire at least one good marketed for sale on a website via a variety of acquisition transaction that is not natively offered on said website for acquisition of said at least one good, wherein said website is operated by a retailer via an e-commerce server system, the transaction system comprising:
    a computing device including a processing unit and a memory communicably connected with and readable by said processing unit, said memory containing instructions that, when executed by the processing unit, cause the processing unit to:
        execute a web browser application, wherein said web browser application is configured to load a browser extension while said web browser application is navigated to said website; and
        execute said browser extension in response to said browser extension having been loaded by said web browser application, wherein said browser extension contains instructions that, when executed, cause said browser extension to:
            monitor a path of navigation of said user through said website;
            determine whether said user has navigated to a shopping cart page in response to said determination, present a user interface that is not native to said website on said shopping cart page, wherein said user interface enables creation of said acquisition transaction between said user and a third party that is distinct from said retailer, wherein said creation requires information pertaining to said at least one good, and wherein said information is extracted from said website by said browser extension via a scraping operation, wherein said acquisition transaction results in said user acquiring said at least one good;
            in response to said determination that said user has navigated to said shopping cart page, and in response to said user interacting with said user interface, scrape product information pertaining to an item added to said shopping cart page by said browser extension;
            compare said scraped information pertaining to said at least one good with said scraped product information pertaining to said item added to said shopping cart page by said browser extension;
            determine whether said item added to said shopping cart page is eligible to be a subject of a lease-to-own transaction based on the comparison by said browser extension; and
            in response to said determination that the said item is eligible and said creation of said acquisition transaction, cause a purchase of said at least one good from said retailer without integration of said transaction system with said e-commerce server system;
        wherein said acquisition transaction comprises the lease-to-own transaction offered to said user by a lease-to-own company, wherein said purchase of said at least one good is conducted by said lease-to-own company so that said lease-to-own company becomes an owner of said at least one good as a result of said purchase, and wherein said lease-to-own company leases said at least one good to said user pursuant to said acquisition transaction; and
        wherein said purchase of said at least one good is conducted by said transaction system via said website.

2. The transaction system of claim 1, wherein said browser extension comprises a manifest file and a script file.

3. The transaction system of claim 2, wherein said manifest file contains data that, when interpreted by said web browser application, causes said web browser application to load said script file in response to said web browser application having been navigated to said website.

4. The transaction system of claim 1, wherein said user interface comprises a button.

5. The transaction system of claim 1, wherein said at least one good comprises a service.

6. The transaction system of claim 1, wherein said causation of said purchase of said at least one good comprises said browser extension communicating with a computing system that is remote from said computing device, to request said remote computing system to conduct said purchase of said at least one good.

7. The transaction system of claim 6, wherein said computing system comprises a plurality of computers.

8. The transaction system of claim 1, wherein said acquisition transaction is subject to terms, and wherein said terms are presented to said user via said user interface presented by said browser extension.

9. A method for permitting a user of a transaction system to acquire at least one good marketed for sale on a website via a variety of acquisition transaction that is not natively offered on said website for acquisition of said at least one good, wherein said website is operated by a retailer via an e-commerce server system, the method comprising:

executing a web browser application, with said transaction system, wherein said web browser application is configured to load a browser extension while said web browser application is navigated to said website; and executing said browser extension, with said transaction system, in response to said browser extension having been loaded by said web browser application;

monitoring a path of navigation of said user through said website;

determining that said user has navigated to a shopping cart page;

in response to said determination, presenting a user interface that is not native to said website on said shopping cart page, with said browser extension, wherein said user interface enables creation of said acquisition transaction between said user and a third party that is distinct from said retailer, wherein said creation requires information pertaining to said at least one good, and wherein said information is extracted from said website by said browser extension via a scraping operation, wherein said acquisition transaction results in said user acquiring said at least one good;

in response to said determination that said user has navigated to said shopping cart page, and in response to said user interacting with said user interface, scraping product information pertaining to an item added to said shopping cart page by said browser extension;

comparing said scraped information pertaining to said at least one good with said scraped product information pertaining to said item added to said shopping cart page by said browser extension;

determining that said item added to said shopping cart page is eligible to be a subject of a lease-to-own transaction based on the comparison by said browser extension;

in response to said determination that the said item is eligible and said creation of said acquisition transaction, causing, with said browser extension, a purchase of said at least one good from said retailer without integration of said transaction system with said e-commerce server system;

wherein said acquisition transaction comprises the lease-to-own transaction offered to said user by a lease-to-own company, wherein said purchase of said at least one good is conducted by said lease-to-own company so that said lease-to-own company becomes an owner of said at least one good as a result of said purchase, and wherein said lease-to-own company leases said at least one good to said user pursuant to said acquisition transaction; and wherein said purchase of said at least one good is conducted by said transaction system via said website.

10. The method of claim 9, wherein said browser extension comprises a manifest file and a script file.

11. The method of claim 10, wherein said manifest file contains data that, when interpreted by said web browser application, causes said web browser application to load said script file in response to said web browser application having been navigated to said website.

12. The method of claim 9, wherein said at least one good is a service.

13. The method of claim 9, wherein said act of causing of said purchase of said at least one good with said browser extension comprises said browser extension communicating with a remote computing system to request said remote computing system to conduct said purchase of said at least one good.

* * * * *